(12) United States Patent
Shah et al.

(10) Patent No.: US 9,525,742 B2
(45) Date of Patent: Dec. 20, 2016

(54) METHOD AND APPARATUS FOR EFFICIENTLY MAINTAINING COMMUNICATIONS CONNECTIVITY FOR A PLURALITY OF APPLICATIONS

(75) Inventors: Yogendra C. Shah, Exton, PA (US); Dolores F. Howry, Malvern, PA (US); Peter S. Wang, East Setauket, NY (US); Ulises Olvera-Hernandex, Kirkland (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 162 days.

(21) Appl. No.: 14/125,024

(22) PCT Filed: Jun. 12, 2012

(86) PCT No.: PCT/US2012/042078
§ 371 (c)(1),
(2), (4) Date: Feb. 27, 2014

(87) PCT Pub. No.: WO2012/174006
PCT Pub. Date: Dec. 20, 2012

(65) Prior Publication Data
US 2014/0226562 A1 Aug. 14, 2014

Related U.S. Application Data

(60) Provisional application No. 61/496,922, filed on Jun. 14, 2011.

(51) Int. Cl.
*H04W 76/04* (2009.01)
*H04L 29/08* (2006.01)
(Continued)

(52) U.S. Cl.
CPC .............. *H04L 67/145* (2013.01); *H04W 4/00* (2013.01); *H04W 68/00* (2013.01); *H04W 76/045* (2013.01)

(58) Field of Classification Search
CPC ...... H04L 69/08; H04L 67/14; H04L 67/2876; H04L 67/145; H04L 43/10; H04L 43/0811; H04W 88/182; H04W 88/06; H04W 88/04; H04W 76/025; H04W 52/0229; Y02B 60/50
See application file for complete search history.

(56) References Cited

U.S. PATENT DOCUMENTS

2001/0038689 A1* 11/2001 Liljestrand ........ H04M 3/42153
379/201.03
2007/0280256 A1* 12/2007 Forslow .................. H04W 4/10
370/395.2

(Continued)

FOREIGN PATENT DOCUMENTS

WO 02/09454 1/2002
WO 2009/134453 11/2009

OTHER PUBLICATIONS

Intel, "Frequent idle-active state transitions caused by mobile data applications," 3GPP TSG-SA1 #53, S1-110120, Nashville, TN, USA (Feb. 14-18, 2011).

(Continued)

*Primary Examiner* — Jung-Jen Liu
(74) *Attorney, Agent, or Firm* — Invention Mine LLC

(57) ABSTRACT

A method and apparatus are described for maintaining communications connectivity for client applications that send keep-alive messages and network applications that send client-alive (i.e., "are you there?") messages. The client applications may register with a client proxy provided in an operating system (OS) of a wireless transmit/receive unit (WTRU) and indicate a respective keep-alive message signaling rate. The network applications may register with a network proxy provided in an OS of a network node and indicate a respective client-alive message signaling rate. The client proxy and/or the network proxy may, respectively, (Continued)

register and prioritize keep-alive and/or client-alive message requirements, determine an optimal signaling rate based on the respective keep-alive and/or client-alive message signaling rates, and generate proxy messages, (i.e., an application layer proxy keep-alive message and/or a network layer proxy client-alive message), associated with the keep-alive and/or client-alive messages. The proxy messages may be transmitted at the optimal signaling rate.

18 Claims, 34 Drawing Sheets

(51) Int. Cl.
*H04W 68/00* (2009.01)
*H04W 4/00* (2009.01)

(56) References Cited

U.S. PATENT DOCUMENTS

| | | | |
|---|---|---|---|
| 2008/0059582 A1* | 3/2008 | Hartikainen | H04L 67/14 709/204 |
| 2008/0076411 A1* | 3/2008 | Khetawat | H04W 24/02 455/432.1 |
| 2008/0076412 A1* | 3/2008 | Khetawat | H04W 24/02 455/432.1 |
| 2008/0076419 A1* | 3/2008 | Khetawat | H04L 12/2602 455/435.1 |
| 2008/0076420 A1* | 3/2008 | Khetawat | H04W 8/04 455/435.1 |
| 2008/0076425 A1* | 3/2008 | Khetawat | H04W 88/12 455/436 |
| 2009/0059848 A1* | 3/2009 | Khetawat | H04L 29/12367 370/328 |
| 2010/0195563 A1* | 8/2010 | Jong | H04B 7/18513 370/321 |
| 2010/0246602 A1* | 9/2010 | Barreto | H04L 49/90 370/466 |
| 2010/0312899 A1* | 12/2010 | Herzog | H04L 67/141 709/228 |
| 2010/0322124 A1* | 12/2010 | Luoma | H04W 72/1242 370/311 |
| 2012/0023190 A1* | 1/2012 | Backholm | H04W 4/18 709/217 |
| 2012/0110173 A1* | 5/2012 | Luna | H04L 69/28 709/224 |
| 2012/0173901 A1* | 7/2012 | Soliman | H04W 88/182 713/320 |

OTHER PUBLICATIONS

NEC, "Architectural Requirements for SIPTO for the local network," 3GPP TSG SA WG2 Meeting #83, S2-111270, Salt Lake City, Utah, USA (Feb. 21-25, 2011).
Qualcomm Incorporated, "Data application impact on real UMTS networks," 3GPP TSG SA WG1#54, S1-111104, Xian, China (May 9-13, 2011).
SA WG2, "New WID: LIPA Mobility and SIPTO at the Local Network," TSG SA Meeting #50, SP-100705, Istanbul, Turkey (Dec. 13-15, 2010).
Third Generation Partnership Project, "Technical Specification Group Core Network; Mobile radio interface layer 3 specification; Core Network Protocols; Stage 3 (Release 1999)," 3GPP TS 24.008 V3.20.0 (Dec. 2005).
Third Generation Partnership Project, "Technical Specification Group Core Network and Terminals; Mobile radio interface Layer 3 specification; Core newtork protocols; Stage 3 (Release 4)," 3GPP TS 24.008 V4.17.0 (Sep. 2007).
Third Generation Partnership Project, " Technical Specification Group Core Network and Terminals; Mobile radio interface Layer 3 specification; Core network protocols; Stage 3 (Release 5)," 3GPP TS 24.008 V5.16.0 (Jun. 2006).
Third Generation Partnership Project, "Technical Specification Group Services and System Aspects; Local IP Access and Selected IP Traffic Offload (LIPA-SIPTO) (Release 10)," 3GPP TR 23.829 V10.0.0 (Mar. 2011).
Third Generation Partnership Project, "Technical Specification Group Services and System Aspects; Local IP Access and Selected IP Traffic Offload (LIPA-SIPTO) (Release 10)," 3GPP TR 23.829 V10.0.1 (Oct. 2011).
Third Generation Partnership Project, "Technical Specification Group Services and System Aspects; General Packet Radio Service (GPRS) enhancements for Evolved Universal Terrestrial Radio Access Network (E-UTRAN) access (Release 8)," 3GPP TS 23.401 V8.13.0 (Mar. 2011).
Third Generation Partnership Project, "Technical Specification Group Services and System Aspects; General Packet Radio Service (GPRS) enhancements for Evolved Universal Terrestrial Radio Access Network (E-UTRAN) access (Release 8)," 3GPP TS 23.401 V8.16.0 (Mar. 2012).
Third Generation Partnership Project, "Technical Specification Group Services and System Aspects; General Packet Radio Service (GPRS) enhancements for Evolved Universal Terrestrial Radio Access Network (E-UTRAN) access (Release 9)," 3GPP TS 23.401 V9.8.0 (Mar. 2011).
Third Generation Partnership Project, "Technical Specification Group Services and System Aspects; General Packet Radio Service (GPRS) enhancements for Evolved Universal Terrestrial Radio Access Network (E-UTRAN) access (Release 9)," 3GPP TS 23.401 V9.12.0 (Mar. 2012).
Third Generation Partnership Project, "Technical Specification Group Services and System Aspects; General Packet Radio Service (GPRS) enhancements for Evolved Universal Terrestrial Radio Access Network (E-UTRAN) access (Release 10)," 3GPP TS 23.401 V10.3.0 (Mar. 2011).
Third Generation Partnership Project, "Technical Specification Group Services and System Aspects; General Packet Radio Service (GPRS) enhancements for Evolved Universal Terrestrial Radio Access Network (E-UTRAN) access (Release 10)," 3GPP TS 23.401 V10.7.0 (Mar. 2012).
Third Generation Partnership Project, "Technical Specification Group Services and System Aspects; General Packet Radio Service (GPRS) enhancements for Evolved Universal Terrestrial Radio Access Network (E-UTRAN) access (Release 11)," 3GPP TS 23.401 V11.1.0 (Mar. 2012).
Third Generation Partnership Project, "Technical Specification Group Services and System Aspects; LIPA Mobility and SIPTO at the Local Network; (Release 11)," 3GPP TR 23.859 V0.2.0 (Apr. 2011).
Third Generation Partnership Project, "Technical Specification Group Services and System Aspects; LIPA Mobility and SIPTO at the Local Network; (Release 12)," 3GPP TR 23.859 V0.5.0 (May 2012).
Third Generation Partnership Project, "Technical Specification Group Core Network and Terminals; Mobile radio interface Layer 3 specification; Core network protocols; Stage 3 (Release 6)," 3GPP TS 24.008 V6.20.0 (Mar. 2010).
Third Generation Partnership Project, "Technical Specification Group Core Network and Terminals; Mobile radio interface Layer 3 specification; Core network protocols; Stage 3 (Release 7)," 3GPP TS 24.008 V7.15.0 (Mar. 2010).
Third Generation Partnership Project, "Technical Specification Group Core Network and Terminals; Mobile radio interface Layer 3 specification; Core network protocols; Stage 3 (Release 8)," 3GPP TS 24.008 V8.13.0 (Mar. 2011).
Third Generation Partnership Project, "Technical Specification Group Core Network and Terminals; Mobile radio interface Layer 3 specification; Core network protocols; Stage 3 (Release 8)," 3GPP TS 24.008 V8.16.0 (Mar. 2012).
Third Generation Partnership Project, "Technical Specification Group Core Network and Terminals; Mobile radio interface Layer 3 specification; Core network protocols; Stage 3 (Release 9)," 3GPP TS 24.008 V9.6.0 (Mar. 2011).

(56) References Cited

OTHER PUBLICATIONS

Third Generation Partnership Project, "Technical Specification Group Core Network and Terminals; Mobile radio interface Layer 3 specification; Core network protocols; Stage 3 (Release 9)," 3GPP TS 24.008 V9.10.0 (Mar. 2012).
Third Generation Partnership Project, "Technical Specification Group Core Network and Terminals; Mobile radio interface Layer 3 specification; Core network protocols; Stage 3 (Release 10)," 3GPP TS 24.008 V10.2.0 (Mar. 2011).
Third Generation Partnership Project, "Technical Specification Group Core Network and Terminals; Mobile radio interface Layer 3 specification; Core network protocols; Stage 3 (Release 10)," 3GPP TS 24.008 V10.6.1 (Mar. 2012).
Third Generation Partnership Project, "Technical Specification Group Core Network and Terminals; Mobile radio interface Layer 3 specification; Core network protocols; Stage 3 (Release 10)," 3GPP TS 24.008 V11.2.1 (Mar. 2012).
Third Generation Partnership Project, "Technical Specification Group Core Network and Terminals; Non-Access-Stratum (NAS) protocol for Evolved Packet System (EPS); Stage 3 (Release 8)," 3GPP TS 24.301 V8.8.0 (Dec. 2010).
Third Generation Partnership Project, "Technical Specification Group Core Network and Terminals; Non-Access-Stratum (NAS) protocol for Evolved Packet System (EPS); Stage 3 (Release 8)," 3GPP TS 24.301 V8.10.0 (Jun. 2011).
Third Generation Partnership Project, "Technical Specification Group Core Network and Terminals; Non-Access-Stratum (NAS) protocol for Evolved Packet System (EPS); Stage 3 (Release 9)," 3GPP TS 24.301 V9.6.0 (Mar. 2011).
Third Generation Partnership Project, "Technical Specification Group Core Network and Terminals; Non-Access-Stratum (NAS) protocol for Evolved Packet System (EPS); Stage 3 (Release 9)," 3GPP TS 24.301 V9.9.0 (Mar. 2012).
Third Generation Partnership Project, "Technical Specification Group Core Network and Terminals; Non-Access-Stratum (NAS) protocol for Evolved Packet System (EPS); Stage 3 (Release 10)," 3GPP TS 24.301 V10.1.0 (Dec. 2010).
Third Generation Partnership Project, "Technical Specification Group Core Network and Terminals; Non-Access-Stratum (NAS) protocol for Evolved Packet System (EPS); Stage 3 (Release 10)," 3GPP TS 24.301 V10.6.1 (Mar. 2012).
Third Generation Partnership Project, "Technical Specification Group Core Network and Terminals; Non-Access-Stratum (NAS) protocol for Evolved Packet System (EPS); Stage 3 (Release 11)," 3GPP TS 24.301 V11.2.1 (Mar. 2012).
Third Generation Partnership Project, "Technical Specification Group Radio Access Network; Radio Resource Control (RRC) protocol specification (Release 1999)," 3GPP TS 25.331 V3.21.0 (Dec. 2004).
Third Generation Partnership Project, "Technical Specification Group Radio Access Network; Radio Resource Control (RRC) protocol specification (Release 4)," 3GPP TS 25.331 V4.20.0 (Dec. 2008).
Third Generation Partnership Project, "Technical Specification Group Radio Access Network; Radio Resource Control (RRC) protocol specification (Release 4)," 3GPP TS 25.331 v4.21.0 Jan. 2012.
Third Generation Partnership Project, "Technical Specification Group Radio Access Network; Radio Resource Control (RRC) protocol specification (Release 5)," 3GPP TS 25.331 V5.24.0 (Jun. 2009).
Third Generation Partnership Project, "Technical Specification Group Radio Access Network; Radio Resource Control (RRC) protocol specification (Release 5)," 3GPP TS 25.331 v5.25.0 Jan. 2012.
Third Generation Partnership Project, "Technical Specification Group Radio Access Network; Radio Resource Control (RRC) protocol specification (Release 6)," 3GPP TS 25.331 V6.25.0 (Mar. 2010).
Third Generation Partnership Project, "Technical Specification Group Radio Access Network; Radio Resource Control (RRC) protocol specification (Release 6)," 3GPP TS 25.331 v6.26.0 Jan. 2012.
Third Generation Partnership Project, "Technical Specification Group Radio Access Network; Radio Resource Control (RRC) protocol specification (Release 7)," 3GPP TS 25.331 V7.19.0 (Mar. 2011).
Third Generation Partnership Project, "Technical Specification Group Radio Access Network; Radio Resource Control (RRC) protocol specification (Release 7)," 3GPP TS 25.331 v7.22.0 Mar. 2012.
Third Generation Partnership Project, "Technical Specification Group Radio Access Network; Radio Resource Control (RRC) protocol specification (Release 8)," 3GPP TS 25.331 V8.14.0 (Mar. 2011).
Third Generation Partnership Project, "Technical Specification Group Radio Access Network; Radio Resource Control (RRC) protocol specification (Release 8)," 3GPP TS 25.331 V8.18.0 (Mar. 2012).
Third Generation Partnership Project, "Technical Specification Group Radio Access Network; Radio Resource Control (RRC) protocol specification (Release 9)," 3GPP TS 25.331 V9.6.0 (Mar. 2011).
Third Generation Partnership Project, "Technical Specification Group Radio Access Network; Radio Resource Control (RRC) protocol specification (Release 9)," 3GPP TS 25.331 V9.10.0 (Mar. 2012).
Third Generation Partnership Project, "Technical Specification Group Radio Access Network; Radio Resource Control (RRC) protocol specification (Release 10)," 3GPP TS 25.331 V10.2.0 (Dec. 2010).
Third Generation Partnership Project, "Technical Specification Group Radio Access Network; Radio Resource Control (RRC) protocol specification (Release 10)," 3GPP TS 25.331 V10.7.0 (Mar. 2012).
Third Generation Partnership Project, "Technical Specification Group Radio Access Network; Radio Resource Control (RRC) protocol specification (Release 11)," 3GPP TS 25.331 V11.1.0 (Mar. 2012).

\* cited by examiner

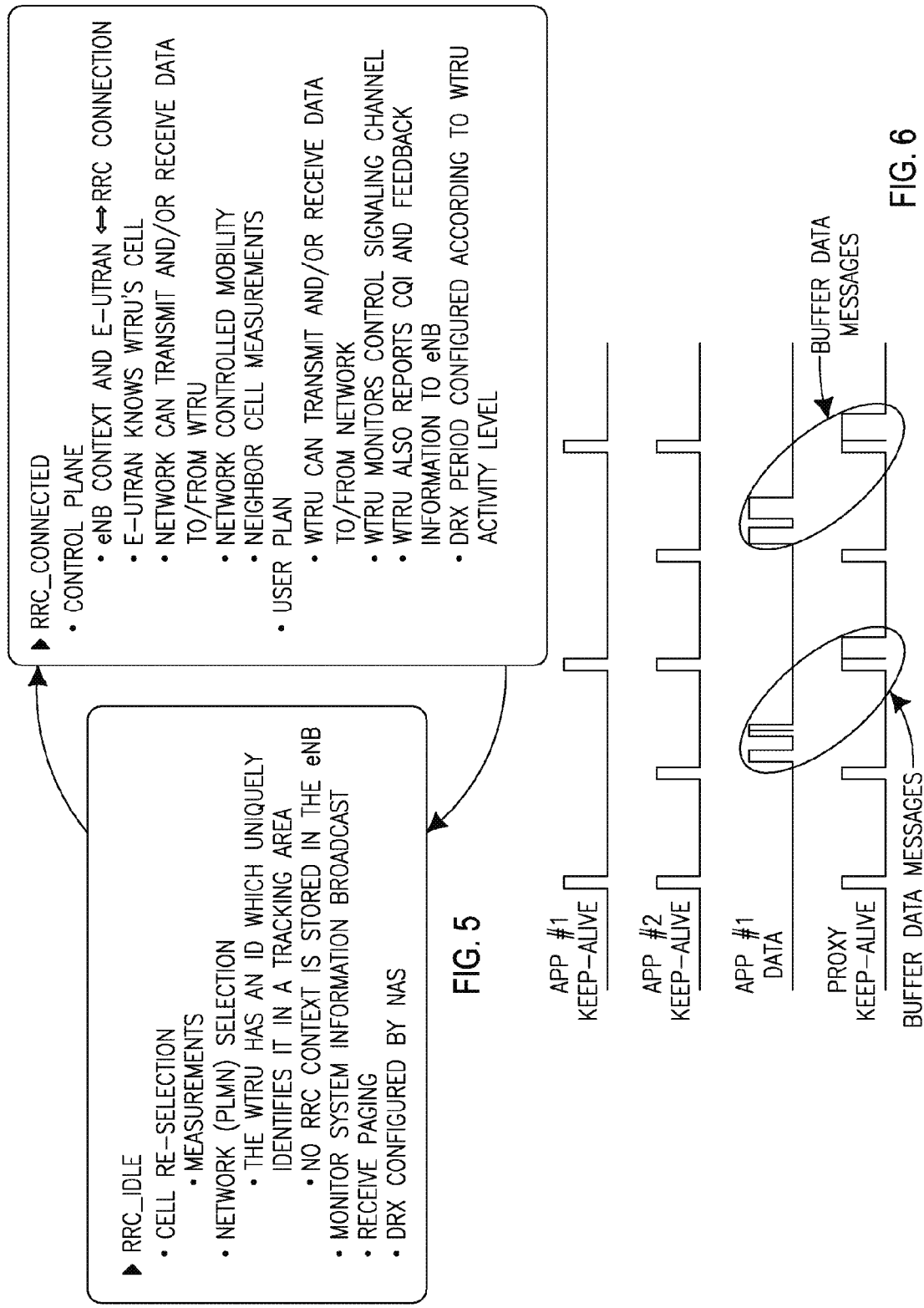

| IEI | INFORMATION ELEMENT | TYPE/REFERENCE | PRESENCE | FORMAT | LENGTH |
|---|---|---|---|---|---|
| | PROTOCOL DISCRIMINATOR | PROTOCOL DISCRIMINATOR | M | V | 1/2 |
| | SECURITY HEADER TYPE | SECURITY HEADER TYPE | M | V | 1/2 |
| 705 | ATTACH REQUEST MESSAGE IDENTITY | MESSAGE TYPE | M | V | 1 |
| | EPS ATTACH TYPE | EPS ATTACH TYPE | M | V | 1/2 |
| | NAS KEY SET IDENTIFIER | NAS KEY SET IDENTIFIER | M | V | 1/2 |
| | EPS MOBILE IDENTITY | EPS MOBILE IDENTITY | M | LV | 5-12 |
| | WTRU NETWORK CAPABILITY | WTRU NETWORK CAPABILITY | M | LV | 3-14 |
| | ESM MESSAGE CONTAINER | ESM MESSAGE CONTAINER | M | LV-E | 5-n |
| 19 | OLD P-TMSI SIGNATURE | P-TMSI SIGNATURE | O | TV | 4 |
| 50 | ADDITIONAL GUTI | EPS MOBILE IDENTITY | O | TLV | 13 |
| 52 | LAST VISITED REGISTERED TAI | TRACKING AREA IDENTITY | O | TV | 6 |
| 5C | DRX PARAMETER | DRX PARAMETER | O | TV | 3 |
| 31 | MS NETWORK CAPABILITY | MS NETWORK CAPABILITY | O | TLV | 4-10 |
| 13 | OLD LOCATION AREA IDENTIFICATION | LOCATION AREA IDENTIFICATION | O | TV | 6 |
| 9- | TMSI STATUS | TMSI STATUS | O | TV | 1 |
| 11 | MOBILE STATION CLASSMARK 2 | MOBILE STATION CLASSMARK 2 | O | TLV | 5 |
| 20 | MOBILE STATION CLASSMARK 3 | MOBILE STATION CLASSMARK 3 | O | TLV | 2-34 |
| 40 | SUPPORTED CODECS | SUPPORTED CODEC LIST | O | TLV | 5-n |
| F- | ADDITIONAL UPDATE TYPE | ADDITIONAL UPDATE TYPE | O | TV | 1 |
| 5D | VOICE DOMAIN PREFERENCE AND WTRU'S USAGE SETTING | VOICE DOMAIN PREFERENCE AND WTRU'S USAGE SETTING | O | TLV | 3 |
| D- | DEVICE PROPERTIES | DEVICE PROPERTIES | O | TV | 1 |

FIG. 7A

```
                                                    ┌─705
EPS ATTACH TYPE VALUE (OCTET 1)
BITS
 3  2  1
 0  0  1   EPS ATTACH
 0  1  0   COMBINED EPS/IMSI ATTACH
 1  1  0   EPS EMERGENCY ATTACH
 1  1  1   RESERVED 0  1  1   KeepAlive ├─710
ALL OTHER VALUES ARE UNUSED AND MAY BE INTERRUPTED AS
"EPS ATTACH", IF RECEIVED BY THE NETWORK.
BIT 4 OF OCTET 1 IS A SPARE AND MAY BE BE CODED AS ZERO.
```

FIG. 7B

| IEI | INFORMATION ELEMENT | TYPE/REFERENCE | PRESENCE | FORMAT | LENGTH |
|---|---|---|---|---|---|
| | PROTOCOL DISCRIMINATOR | PROTOCOL DISCRIMINATOR | M | V | 1/2 |
| | SECURITY HEADER TYPE | SECURITY HEADER TYPE | M | V | 1/2 |
| | ATTACH REJECT MESSAGE IDENTITY | MESSAGE TYPE | M | V | 1 |
| | EMM CAUSE | EMM CAUSE | M | V | 1 |
| 78 | ESM MESSAGE CONTAINER | ESM MESSAGE CONTAINER | O | TLV-E | 6-n |

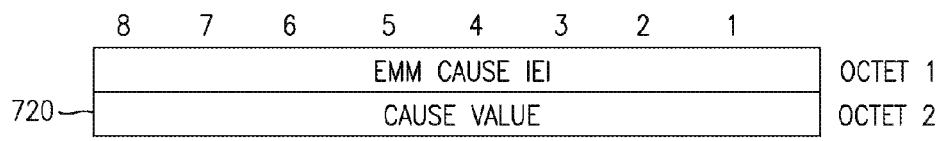

FIG. 7D

CAUSE VALUE 720

```
BITS
8 7 6 5 4 3 2 1
0 0 0 0 0 0 1 0    IMSI UNKNOWN IN HSS
0 0 0 0 0 0 1 1    ILLEGAL WTRU
0 0 0 0 0 1 0 1    IMEI NOT ACCEPTED
0 0 0 0 0 1 1 0    ILLEGAL ME
0 0 0 0 0 1 1 1    EPS SERVICES NOT ALLOWED
0 0 0 0 1 0 0 0    EPS SERVICES AND NON-EPS SERVICES NOT ALLOWED
0 0 0 0 1 0 0 1    WTRU IDENTITY CANNOT BE DERIVED BY THE NETWORK
0 0 0 0 1 0 1 0    IMPLICITY DETACHED
0 0 0 0 1 0 1 1    PLMN NOT ALLOWED
0 0 0 0 1 1 0 0    TRACKING AREA NOT ALLOWED
0 0 0 0 1 1 0 1    ROAMING NOT ALLOWED IN THIS TRACKING AREA
0 0 0 0 1 1 1 0    EPS SERVICES NOT ALLOWED IN THIS PLMN
0 0 0 0 1 1 1 1    NO SUITABLE CELLS IN TRACKING AREA
0 0 0 1 0 0 0 0    MSC TEMPORARILY NOT REACHABLE
0 0 0 1 0 0 0 1    NETWORK FAILURE
0 0 0 1 0 0 1 0    CS DOMAIN NOT AVAILABLE
0 0 0 1 0 0 1 1    ESM FAILURE
0 0 0 1 0 1 0 0    MAC FAILURE
0 0 0 1 0 1 0 1    SYNCH FAILURE
0 0 0 1 0 1 1 0    CONGESTION
0 0 0 1 0 1 1 1    WTRU SECURITY CAPABILITIES MISMATCH
0 0 0 1 1 0 0 0    SECURITY MODE REJECTED, UNSPECIFIED
0 0 0 1 1 0 0 1    NOT AUTHORIZED FOR THIS CSG
0 0 0 1 1 0 1 0    NON-EPS AUTHENTICATION UNACCEPTABLE
0 0 1 0 0 1 1 1    CS SERVICE TEMPORARILY NOT AVAILABLE
0 0 1 0 1 0 0 0    NO EPS BEARER CONTENT ACTIVATED
0 1 0 1 1 1 1 1    SEMANTICALLY INCORRECT MESSAGE
0 1 1 0 0 0 0 0    INVALID MANDATORY INFORMATION
0 1 1 0 0 0 0 1    MESSAGE TYPE NON-EXISTENT OR NOT IMPLEMENTED
0 1 1 0 0 0 1 0    MESSAGE TYPE NOT COMPATIBLE WITH THE PROTOCOL STATE
0 1 1 0 0 0 1 1    INFORMATION ELEMENT NON-EXISTENT OR NOT IMPLEMENTED
0 1 1 0 0 1 0 0    CONDITIONAL IE ERROR
0 1 1 0 0 1 0 1    MESSAGE NOT COMPATIBLE WITH PROTOCOL STATE
0 1 1 1 0 0 0 0    KeepAlive_ACK (NEW BIT PATTERN) }725
0 1 1 0 1 1 1 1    PROTOCOL ERROR, UNSPECIFIED
```

ANY OTHER VALUE RECEIVED BY THE MOBILE STATION MAY BE TREATED AS 0110 1111, "PROTOCOL ERROR, UNSPECIFIED". ANY OTHER VALUE RECEIVED BY THE NETWORK MAY BE TREATED AS 0110 1111, "PROTOCOL ERROR, UNSPECIFIED".

FIG. 7E

| INFORMATION ELEMENT/GROUP NAME | NEED | MULTI | TYPE AND REFERENCE | SEMANTICS DESCRIPTION | VERSION |
|---|---|---|---|---|---|
| MESSAGE TYPE | MP | | MESSAGE TYPE | | |
| RADIO BEARER IEs | | | | | |
| PREDEFINED CONFIGURATION STATUS INFORMATION | MP | | BOOLEAN | TRUE INDICATES THE WTRU HAS ALL PRE-CONFIGURATIONS STORED WITH THE SAME VALUE TAG AS BROADCAST IN THE CELL IN WHICH THE RRC CONNECTION ESTABLISHMENT IS INITIATED | REL-5 |
| WTRU INFORMATION ELEMENTS | | | | | |
| INITIAL WTRU IDENTITY | MP | | INITIAL WTRU IDENTITY | | |
| ESTABLISHMENT CAUSE ~805 | MP | | ESTAB. CAUSE | | |
| PROTOCOL ERROR INDICATOR | MD | | PROTOCOL ERROR INDICATOR | DEFAULT VALUE IS FALSE | |
| >WTRU SPECIFIC BEHAVIOR INFORMATION 1 IDLE | OP | | WTRU SPECIFIC BEHAVIOR INFORMATION 1 IDLE | THIS IE SHALL NOT BE INCLUDED IN THIS VERSION OF THE PROTOCOL | |
| DOMAIN INDICATOR | MP | | CN DOMAIN IDENTITY | | REL-6 |
| CALL TYPE | CV-CS-DOMAIN | | ENUMERATED (SPEECH, VIDEO, OTHER) | ONE SPARE VALUE IS NEEDED | REL-6 |
| WTRU CAPABILITY INDICATION | OP | | ENUMERATED (HS-DSCH, HS-DSCH+ E-DCH) | ABSENCE OF THIS IE IMPLIES THAT NEITHER HS-DSCH NOR E-DCH ARE SUPPORTED BY THE WTRU | REL-6 |

FIG. 8A

| INFORMATION ELEMENT/GROUP NAME | NEED | MULTI | TYPE AND REFERENCE | SEMANTICS DESCRIPTION | VERSION |
|---|---|---|---|---|---|
| MBMS SELECTED SERVICES | OP | | MBMS SELECTED SERVICES SHORT | | REL-6 |
| WTRU MOBILITY STATE INDICATOR | MD | | ENUMERATED (HIGH-MOBILITY DETECTED) | ABSENCE OF THIS IE IMPLIES THAT NEITHER THE HIGH MOBILITY STATE IS NOT APPLICABLE OR IT HAS NOT BEEN DETECTED BY THE WTRU | REL-7 |
| SUPPORT FOR F-DPCH | OP | | ENUMERATED (TRUE) | THE IE SHALL BE SET TO TRUE WHEN F-DPCH IS FULLY SUPPORTED BY THE WTRU. ABSENCE OF THIS INFORMATION ELEMENT INDICATES THAT F-DPCH IS NOT FULLY SUPPORTED. | REL-6 |
| SUPPORT FOR ENHANCED F-DPCH | OP | | ENUMERATED (TRUE) | THE ABSENCE OF THIS IE INDICATES THAT THE WTRU DOES NOT SUPPORT ENHANCED F-DPCH. | REL-7 |
| HS-PDSCH IN CELL_FACH | OP | | ENUMERATED (TRUE) | THE ABSENCE OF THIS IE INDICATES THAT THE WTRU DOES NOT SUPPORT HS-PDSCH RECEPTION IN CELL_FACH STATE. | REL-7 |

FIG. 8B

| INFORMATION ELEMENT/GROUP NAME | NEED | MULTI | TYPE AND REFERENCE | SEMANTICS DESCRIPTION | VERSION |
|---|---|---|---|---|---|
| MAC-ehs support | OP | | ENUMERATED (TRUE) | THE PRESENCE OF THIS IE INDICATES THAT WTRU SUPPORTS MAC-ehs, OCTET ALIGNED TRANSPORT BLOCK TABLE, THE USE OF SPECIAL VALUE OF HE FIELD TO INDICATE END OF AN SDU FOR RLC AM AND DIFFERENT HS-SCCHs IN CONTIGUOUS TTIs. THE ABSENCE OF THIS IE INDICATES THAT THE WTRU DOES NOT SUPPORT EITHER MAC_ehs, OCTET ALIGNED TRANSPORT BLOCK TABLE OR THE USE OF SPECIAL VALUE OF HE FIELD TO INDICATE END OF AN SDU FOR RLC AM OR DIFFERENT HS-SCCHs IN CONTIGUOUS TTIs. | REL-7 |
| DPCCH DISCONTINUOUS TRANSMISSION SUPPORT | OP | | ENUMERATED (TRUE) | THE ABSENCE OF THIS IE INDICATES THAT THE WTRU DOES NOT SUPPORT DPCCH DISCONTINUOUS TRANSMISSION | REL-7 |
| SUPPORT OF COMMON E-DCH | OP | | ENUMERATED (TRUE) | THE ABSENCE OF THIS IE INDICATES THAT THE WTRU DOES NOT SUPPORT E-DCH ENHANCED RANDOM ACCESS IN CELL_FACH STATE AND IDLE MODE. | REL-8 |
| MULTI CELL SUPPORT | OP | | ENUMERATED (TRUE) | THE ABSENCE OF THIS IE INDICATES THAT THE WTRU DOES NOT SUPPORT DUAL CELL OPERATIONS ON ADJACENT FREQUENCIES | REL-8 |

FIG. 8C

| INFORMATION ELEMENT/GROUP NAME | NEED | MULTI | TYPE AND REFERENCE | SEMANTICS DESCRIPTION | VERSION |
|---|---|---|---|---|---|
| DUAL CELL MIMO SUPPORT | OP | | ENUMERATED (TRUE) | THE ABSENCE OF THIS IE INDICATES THAT THE WTRU DOES NOT SUPPORT DUAL CELL WITH MIMO OPERATION ON ADJACENT FREQUENCIES. | REL-9 |
| PRE-REDIRECTION INFO | OP | | PRE-REDIRECTION INFO | THE PRESENCE OF THIS IE INDICATES THE WTRU SUPPORT OF RADIO ACCESS TECHNOLOGIES THAT THE WTRU COULD BE DIRECTED TO. | REL-8 |
| SUPPORT OF MAC-i/is | OP | | ENUMERATED (TRUE) | THE ABSENCE OF THIS IE INDICATES THAT THE WTRU DOES NOT SUPPORT MAC-i/is OPERATION. | REL-8 |
| SUPPORT OF SPS OPERATION | OP | | ENUMERATED (TRUE) | FOR 1.28 Mcps TDD ONLY. THE ABSENCE OF THIS IE INDICATES THAT THE WTRU DOES NOT SUPPORT SPS OPERATION. | REL-8 |
| SUPPORT FOR CS VOICE OVER HSPA | OP | | ENUMERATED (TRUE) | THE IE INDICATES THE WTRU's SUPPORT FOR CS VOICE OVER HSPA, IF SET. | REL-8 |
| MEASUREMENT INFORMATION ELEMENTS | | | | | |
| MEASURED RESULTS ON RACH | OP | | MEASURED RESULTS ON RACH | | |
| ACCESS STRATUM RELEASE INDICATOR | MP | | ENUMERATED (REL-4, | ABSENCE OF THE IE IMPLIES R99. THE IE ALSO INDICATES THE RELEASE OF THE RRC TRANSFER SYNTAX SUPPORTED BY THE WTRU 11 SPARE VALUES ARE NEEDED. | REL-4 |
| | | | REL-5, | | REL-5 |
| | | | REL-6, | | REL-6 |
| | | | REL-7, | | REL-7 |
| | | | REL-8) | | REL-8 |

FIG. 8D

| INFORMATION ELEMENT/GROUP NAME | NEED | MULTI | TYPE AND REFERENCE | SEMANTICS DESCRIPTION |
|---|---|---|---|---|
| ESTABLISHMENT CAUSE ⸺805 | MP | | ENUMERATED (ORIGINATING CONVERSATIONAL CALL, ORIGINATING STREAMING CALL, ORIGINATING INTERACTIVE CALL, ORIGINATING BACKGROUND CALL, ORIGINATING SUBSCRIBED TRAFFIC CALL, TERMINATING CONVERSATIONAL CALL, TERMINATING STREAMING CALL, TERMINATING INTERACTIVE CALL, TERMINATING BACKGROUND CALL, EMERGENCY CALL, INTER-RAT CELL RE-SELECTION, INTER-RAT CELL CHANGE ORDER, REGISTRATION, DETACH, ORIGINATING HIGH PRIORITY SIGNALLING, ORIGINATING LOW PRIORITY SIGNALLING, CALL RE-ESTABLISHMENT, TERMINATING HIGH PRIORITY SIGNALLING, TERMINATING LOW PRIORITY SIGNALLING, TERMINATING-CAUSE UNKNOWN, MBMS RECEPTION, MBMS PTP RB REQUEST, MO-KeepAlive) ⸽—905 | ELEVEN SPARE VALUES ARE NEEDED. |

FIG. 9

| INFORMATION ELEMENT/GROUP NAME | NEED | MULTI | TYPE AND REFERENCE | SEMANTICS DESCRIPTION | VERSION |
|---|---|---|---|---|---|
| MESSAGE TYPE | MP | | MESSAGE TYPE | | |
| WTRU INFORMATION ELEMENTS | | | | | |
| RRC TRANSACTION IDENTIFIER | MP | | RRC TRANSACTION IDENTIFIER | | |
| INITIAL WTRU IDENTITY | MP | | INITIAL WTRU IDENTITY | | |
| REJECTION CAUSE — 1005 | MP | | REJECTION CAUSE | | |
| WAIT TIME | MP | | WAIT TIME | | |
| REDIRECTION INFO | OP | | REJECTION INFO | | |
| COUNTING COMPLETION | OP | | ENUMERATED (TRUE) | THIS FIELD MAY BE PRESENT IF THE REJECTION CAUSE IS SET TO "UNSPECIFIED" OTHERWISE IT MAY BE IGNORED. | REL-6 |

FIG. 10

| INFORMATION ELEMENT/GROUP NAME | NEED | MULTI | TYPE AND REFERENCE | SEMANTICS DESCRIPTION |
|---|---|---|---|---|
| REJECTION CAUSE — 1005 | MP | | ENUMERATED (CONGESTION UNSPECIFIED) | |

FIG. 11

| IEI | INFORMATION ELEMENT | TYPE AND REFERENCE | PRESENCE | FORMAT | LENGTH |
|---|---|---|---|---|---|
| | PROTOCOL DISCRIMINATOR | PROTOCOL DISCRIMINATOR | M | V | 1/2 |
| | SKIP INDICATOR | SKIP INDICATOR | M | V | 1/2 |
| | ROUTING AREA UPDATE REQUEST MESSAGE IDENTITY | MESSAGE TYPE | M | V | 1 |
| | UPDATE TYPE | UPDATE TYPE | M | V | 1/2 |
| | GPRS CIPHERING KEY SEQUENCE NUMBER | CIPHERING KEY SEQUENCE NUMBER | M | V | 1/2 |
| | OLD ROUTING AREA IDENTIFICATION | ROUTING AREA IDENTIFICATION | M | V | 6 |
| | MS RADIO ACCESS CAPABILITY | MS RADIO ACCESS CAPABILITY | M | LV | 6-52 |
| 19 | OLD P-TMSI SIGNATURE | P-TMSI SIGNATURE | O | TV | 4 |
| 17 | REQUESTED READY TIMER VALUE | GPRS TIMER | O | TV | 2 |
| 27 | DRX PARAMTER | DRX PARAMTER | O | TV | 3 |
| 9- | TMSI STATUS | TMSI STATUS | O | TV | 1 |
| 18 | P-TMSI | MOBILE IDENTITY | O | TLV | 7 |
| 31 | MS NETWORK CAPABILITY | MS NETWORK CAPABILITY | O | TLV | 4-10 |
| 32 | PDP CONTEXT STATUS | PDP CONTEXT STATUS | O | TLV | 4 |
| 33 | PS LCS CAPABILITY | PS LCS CAPABILITY | O | TLV | 3 |
| 35 | MBMS CONTEXT STATUS | MBMS CONTEXT STATUS | O | TLV | 2-18 |
| TBD | KEEP ALIVE STATUS | KEEP ALIVE STATUS | O | TLV | TBD |

| INFORMATION ELEMENT/GROUP NAME | NEED | MULTI | TYPE AND REFERENCE | SEMANTICS DESCRIPTION | VERSION |
|---|---|---|---|---|---|
| MESSAGE TYPE | MP | | MESSAGE TYPE | | |
| WTRU INFORMATION ELEMENTS | | | | | |
| U-RNTI | MP | | U-RNTI | | |
| RRC TRANSACTION IDENTIFIER | CV-FAIL-URE | | RRC TRANSACTION IDENTIFIER | | |
| INTEGRITY CHECK INFO | CH | | INTEGRITY CHECK INFO | | |
| START LIST | MP | 1 TO <max CN DOM-AINS> | | START VALUES FOR ALL CN DOMAINS. | |
| >CN DOMAIN IDENTITY | MP | | CN DOMAIN IDENTITY | | |
| >START | MP | | START | START VALUE TO BE USED IN THIS CN DOMAIN. | |
| AM_RLC ERROR INDICATION (RB2, RB3 OR RB4) | MP | | BOOLEAN | TRUE INDICATES AM_RLC UNRECOVERABLE ERROR OCCURRED ON RB2, RB3 OR RB4 IN THE WTRU. | |
| AM_RLC ERROR INDICATION (RB>4) | MP | | BOOLEAN | TRUE INDICATES AM_RLC UNRECOVERABLE ERROR OCCURRED ON RB>4 IN THE WTRU. | |
| CELL UPDATE CAUSE | MP | | CELL UPDATE CAUSE | | |

FIG. 13A

| INFORMATION ELEMENT/GROUP NAME | NEED | MULTI | TYPE AND REFERENCE | SEMANTICS DESCRIPTION | VERSION |
|---|---|---|---|---|---|
| TRAFFIC VOLUME INDICATOR | OP | | ENUMERATED (TRUE) | THIS IE SHALL BE SET TO TRUE WHEN THE CRITERIA FOR EVENT BASED TRAFFIC VOLUME MEASUREMENT REPORTING IS FULFILLED. ABSENCE OF THIS ELEMENT MEANS NOT FULFILLED. | REL-6 |
| FAILURE CAUSE | OP | | FAILURE CAUSE AND ERROR INFORMATION | | |
| RB TIMER INDICATOR | MP | | RB TIMER INDICATOR | | |
| ESTABLISHMENT CAUSE ~1305 | OP | | ESTABLISHMENT CAUSE | | REL-5 |
| CS CALL TYPE | CV-conversational CS | | ENUMERATED (SPEECH, VIDEO, OTHER) | ONE SPARE VALUE IS NEEDED | REL-7 |
| HS-PDSCH IN CELL_FACH | OP | | ENUMERATED (TRUE) | THE ABSENCE OF THIS IE INDICATES THAT THE WTRU DOES NOT SUPPORT HS-PDSCH RECEPTION IN CELL_FACH STATE. | REL-7 |
| SUPPORT OF COMMON E-DCH | OP | | ENUMERATED (TRUE) | THE ABSENCE OF THIS IE INDICATES THAT THE WTRU DOES NOT SUPPORT E-DCH ENHANCED RANDOM ACCESS IN CELL_FACH STATE AND IDLE MODE. | REL-8 |
| SUPPORT OF HS-DSCH DRX OPERATION | OP | | ENUMERATED (TRUE) | THE ABSENCE OF THIS IE INDICATES THAT THE WTRU DOES NOT SUPPORT HS-DSCH DRX OPERATION IN CELL_FACH STATE. | REL-8 |

FIG. 13B

| INFORMATION ELEMENT/GROUP NAME | NEED | MULTI | TYPE AND REFERENCE | SEMANTICS DESCRIPTION | VERSION |
|---|---|---|---|---|---|
| SUPPORT OF MAC-i/is | OP | | ENUMERATED (TRUE) | THE ABSENCE OF THIS IE INDICATES THAT THE WTRU DOES NOT SUPPORT MAC-i/is OPERATION. | REL-8 |
| WTRU MOBILITY STATE INDICATOR | MD | | ENUMERATED (HIGH-mobility Detected) | ABSENCE OF THIS IE IMPLIES EITHER THE HIGH MOBILITY STATE IS NOT APPLICABLE OR IT HAS NOT BEEN DETECTED BY THE WTRU. | REL-7 |
| CAPABILITY CHANGE INDICATOR | OP | | ENUMERATED (TRUE) | TRUE INDICATES THAT THE WTRU CAPABILITY HAS CHANGED COMPARED TO THE VALUE STORED IN THE VARIABLE WTRU_CAPABILITY_ TRANSFERRED. | REL-7 |
| RECONFIGURATION STATUS INDICATOR | OP | | ENUMERATED (TRUE) | TRUE INDICATES A RECONFIGURATION PROCEDURE IS ONGOING WITHIN THE WTRU OR A RESPONSE MESSAGE HAS BEEN SUBMITTED TO RLC AND THE WTRU IS WAITING FOR THE LAYER 2 ACK. | REL-6 |
| MBMS SELECTED SERVICES | OP | | MBMS SELECTED SERVICES SHORT | | REL-6 |
| SUPPORT FOR TWO DRX SCHEMES IN URA_PCH AND CELL_PCH | OP | | ENUMERATED (TRUE) | THE ABSENCE OF THIS IE INDICATES THAT THE WTRU DOES NOT SUPPORT TWO DRX SCHEMES IN URA_ PCH AND CELL_PCH | REL-7 |
| MEASUREMENT INFORMATION ELEMENTS | | | | | |
| MEASURED RESULTS ON RACH | OP | | MEASURED RESULTS ON RACH | | |

FIG. 13C

| INFORMATION ELEMENT/GROUP NAME | NEED | MULTI | TYPE AND REFERENCE | SEMANTICS DESCRIPTION | VERSION |
|---|---|---|---|---|---|
| MESSAGE TYPE | MP | | MESSAGE TYPE | | |
| WTRU INFORMATION ELEMENTS | | | | | |
| U-RNTI | CV-CCCH | | U-RNTI | | |
| RRC TRANSACTION IDENTIFIER | MP | | RRC TRANSACTION IDENTIFIER | | |
| INTEGRITY CHECK INFO | CH | | INTEGRITY CHECK INFO | | |
| INTEGRITY PROTECTION MODE INFO | OP | | INTEGRITY PROTECTION MODE INFO | THE UTRAN SHOULD NOT INCLUDE THIS IE UNLESS IT IS PERFORMING AN SRNS RELOCATION OR A CELL RESELECTION FROM GERAN Iu mode | |
| CIPHERING MODE INFO | OP | | CIPHERING MODE INFO | THE UTRAN SHOULD NOT INCLUDE THIS IE UNLESS IT IS PERFORMING EITHER AN SRNS RELOCATION OR A CELL RESELECTION FROM GERAN Iu mode, AND A CHANGE IN CIPHERING ALGORITHM. | |
| ACTIVATION TIME | MD | | ACTIVATION TIME | DEFAULT VALUE IS "NOW". | |
| NEW U-RNTI | OP | | NEW U-RNTI | | |
| NEW C-RNTI | OP | | C-RNTI | | |
| NEW DSCH-RNTI | OP | | DSCH-RNTI | SHOULD NOT BE SET IF FDD. IF RECEIVED, THE WTRU SHOULD IGNORE IT. | |
| NEW H-RNTI | OP | | H-RNTI | | REL-5 |
| NEW PRIMARY E-RNTI | OP | | E-RNTI | | REL-6 |
| NEW SECONDARY E-RNTI | OP | | E-RNTI | FDD ONLY | REL-6 |

FIG. 14A

| INFORMATION ELEMENT/GROUP NAME | NEED | MULTI | TYPE AND REFERENCE | SEMANTICS DESCRIPTION | VERSION |
|---|---|---|---|---|---|
| RRC STATE INDICATOR | MP | | RRC STATE INDICATOR | | |
| UTRAN DRX CYCLE LENGTH COEFFCIENT | OP | | UTRAN DRX CYCLE LENGTH COEFFICIENT | | |
| WAIT TIME | OP | | WAIT TIME | | |
| RLC RE-ESTABLISH INDICATOR (RB2, RB3 AND RB4) | MP | | RLC RE-ESTABLISH INDICATOR | SHOULD NOT BE SET TO TRUE IF IE "DOWNLINK COUNTER SYNCHRONIZATION INFO" IS INCLUDED IN MESSAGE. | |
| RLC RE-ESTABLISH INDICATOR (RB5 AND FORWARD) | MP | | RLC RE-ESTABLISH INDICATOR | SHOULD NOT BE SET TO TRUE IF IE "DOWNLINK COUNTER SYNCHRONIZATION INFO" IS INCLUDED IN MESSAGE. | |
| CN INFORMATION ELEMENTS | | | | | |
| CN INFORMATION INFO | OP | | CN INFORMATION | | |
| UTRAN INFORMATION ELEMENTS | | | | | |
| URA IDENTITY | OP | | URA IDENTITY | | |
| RNC SUPPORT FOR CHANGE OF WTRU CAPABILITY | OP | | BOOLEAN | SHOULD BE INCLUDED IF THE MESSAGE IS USED TO PERFORM AN SRNS RELOCATION. | REL-7 |
| SPECIFICATION MODE INFORMATION ELEMENTS | | | | | REL-8 |
| DEFAULT CONFIGURATION FOR CELL_FACH | OP | | DEFAULT CONFIG- URATION FOR CELL_FACH | | REL-8 |

FIG. 14B

| INFORMATION ELEMENT/GROUP NAME | NEED | MULTI | TYPE AND REFERENCE | SEMANTICS DESCRIPTION | VERSION |
|---|---|---|---|---|---|
| RB INFORMATION ELEMENTS | | | | | |
| RAB INFORMATION FOR SETUP | CV-CS | | RAB INFORMATION FOR SETUP | RAB IDENTITY SHALL BE IDENTICAL TO THE ONE CURRENTLY CONFIGURED AND WTRU BEHAVIOR IS UNSPECIFIED OTHERWISE. | |
| RB INFORMATION TO RELEASE LIST | OP | 1 TO <max RB> | | | |
| >RB INFORMATION TO RELEASE | MP | | RB INFORMATION TO RELEASE | | |
| RB INFORMATION TO RECONFIGURE LIST | OP | 1 TO <max RB> | | | |
| >RB INFORMATION TO RECONFIGURE | MP | | RB INFORMATION TO RECONFIGURE | | |
| RB INFORMATION TO BE AFFECTED LIST | OP | 1 TO <max RB> | | | |
| >RB INFORMATION TO BE AFFECTED | MP | | RB INFORMATION TO BE AFFECTED | | |
| DOWNLINK COUNTER SYNCHRONIZATION INFO | OP | | | | |
| >RB WITH PDCP INFORMATION LIST | OP | 1 TO <max RBall RABs> | | | |

FIG. 14C

| INFORMATION ELEMENT/GROUP NAME | NEED | MULTI | TYPE AND REFERENCE | SEMANTICS DESCRIPTION | VERSION |
|---|---|---|---|---|---|
| >>RB WITH PDCP INFORMATION | MP | | RB WITH PDCP INFORMATION | THIS IE IS NEEDED FOR EACH RB HAVING PDCP IN THE CASE OF LOSSLESS SRNS RELOCATION. | |
| | OP | | | | REL-5 |
| >>PDCP CONTEXT RELOCATION INFO | OP | | PDCP CONTEXT RELOCATION INFO | THIS IE IS NEEDED FOR EACH RB HAVING PDCP AND PERFORMING PDCP CONTEXT RELOCATION. | REL-5 |
| PDCP ROHC TARGET MODE | OP | | PDCP ROHC TARGET MODE | | REL-5 |
| TrCH INFORMATION ELEMENTS | | | | | |
| UPLINK TRANSPORT CHANNELS | | | | | |
| UL TRANSPORT CHANNEL INFORMATION COMMON FOR ALL TRANSPORT CHANNELS | OP | | UL TRANSPORT CHANNEL INFORMATION COMMON FOR ALL TRANSPORT CHANNELS | | |
| DELETED TrCH INFORMATION LIST | OP | 1 TO <max TrCH> | | | |
| >DELETED UL TrCH INFORMATION | MP | | DELETED UL TrCH INFORMATION | | |
| ADDED OR RECONFIGURED TrCH INFORMATION LIST | OP | 1 TO <max TrCH> | | | |
| >ADDED OR RECONFIGURED UL TrCH INFORMATION | MP | | ADDED OR RECONFIGURED UL TrCH INFORMATION | | |

FIG. 14D

| INFORMATION ELEMENT/GROUP NAME | NEED | MULTI | TYPE AND REFERENCE | SEMANTICS DESCRIPTION | VERSION |
|---|---|---|---|---|---|
| DOWNLINK TRANSPORT CHANNELS | | | | | |
| DL TRANSPORT CHANNEL INFORMATION COMMON FOR ALL TRANSPORT CHANNELS | OP | | DL TRANSPORT CHANNEL INFORMATION COMMON FOR ALL TRANSPORT CHANNELS | | |
| DELETED TrCH INFORMATION LIST | OP | 1 TO <max TrCH> | | | |
| >DELETED DL TrCH INFORMATION | MP | | DELETED DL TrCH INFORMATION | | |
| ADDED OR RECONFIGURED TrCH INFORMATION LIST | OP | 1 TO <max TrCH> | | | |
| >ADDED OR RECONFIGURED DL TrCH INFORMATION | MP | | ADDED OR RECON- FIGURED DL TrCH INFORMATION | | |
| PhyCH INFORMATION ELEMENTS | | | | | |
| FREQUENCY INFO | OP | | FREQUENCY INFO | | |
| MULTI-FREQUENCY INFO | OP | | MULTI- FREQUENCY INFO | THIS IE IS USED FOR 1.28 Mcps TDD ONLY. | REL-7 |
| DTX-DRX TIMING INFORMATION | OP | | DTX-DRX TIMING INFORMATION | | REL-7 |
| DTX-DRX INFORMATION | OP | | DTX-DRX INFORMATION | | REL-7 |
| HS-SCCH LESS INFORMATION | OP | | HS-SCCH LESS INFORMATION | | REL-7 |

FIG. 14E

| INFORMATION ELEMENT/GROUP NAME | NEED | MULTI | TYPE AND REFERENCE | SEMANTICS DESCRIPTION | VERSION |
|---|---|---|---|---|---|
| MIMO PARAMETERS | OP | | MIMO PARAMETERS | | REL-7 |
| CONTROL CHANNEL DRX INFORMATION | OP | | CONTROL CHANNEL DRX INFORMATION | THIS IE IS USED FOR 1.28 Mcps TDD ONLY. | REL-8 |
| SPS INFORMATION | OP | | SPS INFORMATION 1.28 Mcps TDD | THIS IE IS USED FOR 1.28 Mcps TDD ONLY. | REL-8 |
| UPLINK RADIO RESOURCES | | | | | |
| MAXIMUM ALLOWED UL TX POWER | MD | | MAXIMUM ALLOWED UL TX POWER | DEFAULT VALUE IS THE EXISTING MAXIMUM UL TX POWER | |
| UPLINK DPCH INFO | OP | | UPLINK DPCH INFO | | |
| E-DCH INFO | OP | | E-DCH INFO | | REL-6 |
| UPLINK SECONDARY CELL INFO FDD | OP | | UPLINK SECONDARY CELL INFO FDD | FDD ONLY | REL-9 |
| DOWNLINK RADIO RESOURCES | | | | | |
| DOWNLINK HS_PDSCH INFORMATION | OP | | DOWNLINK HS_PDSCH INFORMATION | | REL-5 |
| DOWNLINK INFORMATION COMMON FOR ALL RADIO LINKS | OP | | DOWNLINK INFORMATION COMMON FOR ALL RADIO LINKS | | |

FIG. 14F

| INFORMATION ELEMENT/GROUP NAME | NEED | MULTI | TYPE AND REFERENCE | SEMANTICS DESCRIPTION | VERSION |
|---|---|---|---|---|---|
| DOWNLINK INFORMATION PER RADIO LINK LIST | OP | 1 TO <max RL> | | SEND DOWNLINK INFORMATION FOR EACH RADIO LINK TO BE SET-UP | |
| >DOWNLINK INFORMATION FOR EACH RADIO LINK | MP | | DOWNLINK INFORMATION FOR EACH RADIO LINK | | |
| DOWNLINK SECONDARY CELL INFO FDD | OP | | DOWNLINK SECONDARY CELL INFO FDD | FDD ONLY | REL-8 |
| MBMS PL SERVICE RESTRICTION INFORMATION | OP | | ENUMERATED (TRUE) | | REL-6 |
| KeepAlive_ACK 1405 | OP | | ENUMERATED (TRUE) | | REL-9 |

FIG. 14G

| INFORMATION ELEMENT/GROUP NAME | NEED | MULTI | TYPE AND REFERENCE | SEMANTICS DESCRIPTION | VERSION |
|---|---|---|---|---|---|
| MESSAGE TYPE | MP | | MESSAGE TYPE | | |
| WTRU INFORMATION ELEMENTS | | | | | |
| PAGING RECORD LIST | OP | 1 TO <max Page 1> | | | |
| >PAGING RECORD 1505 | MP | | PAGING RECORD | | |
| OTHER INFORMATION ELEMENTS | | | | | |
| BCCH MODIFICATION INFO | OP | | BCCH MODIFICATION INFO | | |
| ETWS INFORMATION | OP | | ETWS INFORMATION | | REL-8 |

FIG. 15

| INFORMATION ELEMENT/GROUP NAME | NEED | MULTI | TYPE AND REFERENCE | SEMANTICS DESCRIPTION | VERSION |
|---|---|---|---|---|---|
| CHOICE USED PAGING IDENTITY | MP | | | | |
| >CN IDENTITY | | | | | |
| >>PAGING CAUSE 1605 | MP | | PAGING CAUSE | | |
| >>CN DOMAIN IDENTITY | MP | | CN DOMAIN IDENTITY | | |
| >>CHOICE WTRU IDENTITY | MP | | | THREE SPARE VALUES ARE NEEDED. | |
| >>IMSI (GSM-MAP) | | | IMSI (GSM-MAP) | | |
| >>TMSI (GSM-MAP) | | | TMSI (GSM-MAP) | | |
| >>>P-TMSI (GSM-MAP) | | | P-TMSI (GSM-MAP) | | |
| >>>IMSI (DS-41) | | | TIA/EIA/IS-2000-4 | | |
| >>>TMSI (DS-41) | | | TIA/EIA/IS-2000-4 | | |
| >>ARE YOU THERE? (i.e., CLIENT-ALIVE) INFORMATION 1610 | OP | | NEW ARE YOU THERE IE TYPE | | |
| >UTRAN SINGLE WTRU IDENTITY | | | | | |
| >>U-RNTI | MP | | U-RNTI | | |
| >>CN ORIGINATED PAGE TO CONNECTED MODE WTRU | OP | | | | |

1505 (table reference)

FIG. 16A

| INFORMATION ELEMENT/GROUP NAME | NEED | MULTI | TYPE AND REFERENCE | SEMANTICS DESCRIPTION | VERSION |
|---|---|---|---|---|---|
| >>>PAGING CAUSE | MP | | PAGING CAUSE | | |
| >>>CN DOMAIN IDENTITY | MP | | CN DOMAIN IDENTITY | | |
| >>>PAGING RECORD TYPE IDENTIFIER | MP | | PAGING RECORD TYPE IDENTIFIER | | |

FIG. 16B

| INFORMATION ELEMENT/GROUP NAME | NEED | MULTI | TYPE AND REFERENCE | SEMANTICS DESCRIPTION |
|---|---|---|---|---|
| PAGING CAUSE 1605 | MP | | ENUMERATED (TERMINATING CONVERSATIONAL CALL, TERMINATING STREAMING CALL, TERMINATING INTERACTIVE CALL, TERMINATING BACKGROUND CALL, TERMINATING HIGH PRIORITY SIGNALING, TERMINATING LOW PRIORITY SIGNALING, TERMINATING-CAUSE UNKNOWN, ARE YOU THERE?) | ONE SPARE VALUE IS NEEDED. |

FIG. 17

METHOD AND APPARATUS FOR EFFICIENTLY MAINTAINING COMMUNICATIONS CONNECTIVITY FOR A PLURALITY OF APPLICATIONS

CROSS REFERENCE TO RELATED APPLICATIONS

This application is a 371 National Phase of International Patent Application No. PCT/US2012/042078, filed Jun. 12, 2012, which claims the benefit of U.S. Provisional Application Ser. No. 61/496,922 filed Jun. 14, 2011, the content of which is hereby incorporated by reference.

BACKGROUND

Wireless transmit/receive units (WTRUs), (e.g., smartphones and other persistently connected wireless devices), may pose a significant data communication and signaling burden on modern wireless communication networks when a variety of applications running on the WTRUs frequently exchange a few bytes of data, (i.e., "sip" data). These applications may be used to support Web browsing, email, weather and/or news updates, voice over Internet protocol (VoIP), (e.g., Skype), social networking (e.g., facebook, Twitter), geographic services (e.g., foursquare), online games, and messaging (e.g., short message service (SMS) and instant messaging).

Social networking applications such as foursquare may generate status update messages upon geographic position changes, (e.g., driving from home to work or meeting friends for dinner). Social networking servers may push content and presence update messages of the subscriber's friends to the applications running on the WTRUs, (e.g., facebook may send a notice when your friend tags you on a picture or signs off from the service). The signaling rate of such content and presence update messages may range from sporadic to periodic up to every 60 seconds through each day. These messages may generate very little data traffic although they may generate a tremendous amount of signaling traffic while also impacting the battery life of the WTRUs. Many of these applications may maintain this alert state while being dormant by way of "keep-alive" messages, which may occur any time an application is active, which is a likely situation since many applications launch when a WTRU is turned on and remain active. Thus, these messages may be generated twenty-four hours a day and generally without the knowledge of the user and when the WTRU is seemingly not being used.

SUMMARY

A method and apparatus are described for maintaining communications connectivity for client applications that send keep-alive messages and network applications that send client-alive (i.e., "are you there?") messages. The client applications may register with a client proxy provided in an operating system (OS) of a wireless transmit/receive unit (WTRU) and indicate a respective keep-alive message signaling rate. The network applications may register with a network proxy provided in an OS of a network node and indicate a respective client-alive message signaling rate. The client proxy and/or the network proxy may, respectively, register and prioritize keep-alive and/or client-alive message requirements, determine an optimal signaling rate based on the respective keep-alive and/or client-alive message signaling rates, and generate proxy messages, (i.e., an application layer proxy keep-alive signaling message and/or a network layer proxy client-alive message), associated with the keep-alive and/or client-alive messages, as required by an application or at a regulated signaling rate determined by an agreement between the WTRU and the network node. The proxy messages may be transmitted at the optimal signaling rate.

The proxy messages may be transformed to an access stratum (AS) layer message or a non-access stratum (NAS) layer message, which may be transmitted at optimal signaling rate, (e.g., the lowest possible signaling rate of the collective keep-alive and client-alive messages to maintain an "always on" connection for all applications and associated applications servers).

BRIEF DESCRIPTION OF THE DRAWINGS

A more detailed understanding may be had from the following description, given by way of example in conjunction with the accompanying drawings wherein:

FIG. 5 shows an example of the radio resource control (RRC) states in long term evolution (LTE);

FIG. 6 shows an example of buffering of data messages by a proxy function;

FIG. 7A shows an example of the content of an attach request non-access stratum (NAS) message including an evolved packet system (EPS) attach type information element (IE) configured to convey the keep-alive signaling;

FIG. 7B shows an example of the content of the EPS attach type IE of FIG. 7A including keep-alive bits;

FIG. 7C shows an example of the content of a NAS attach reject message including an attach reject message identity IE configured to convey keep-alive signaling;

FIG. 7D shows an example of the content of an EPS mobility management (EMM) cause IE and a cause value to convey keep-alive signaling;

FIG. 7E shows an example of bits of the cause value including keep-alive bits;

FIGS. 8A-8D show an example of the content of a modified RRC connection request message including an establishment cause IE to convey keep-alive signaling;

FIG. 9 shows an example of the content of the establishment cause of the modified RCC connection request message of FIGS. 8A-8D;

FIG. 10 shows an example of an RRC connection reject message including a rejection cause IE to convey keep-alive signaling;

FIG. 11 shows an example of the content of the rejection cause IE of the modified RRC connection reject message of FIG. 10;

FIG. 12 shows an example of the content of a modified routing area update (RAU) request message to convey keep-alive signaling;

FIGS. 13A-13C show an example of the content of a modified cell update message to convey keep-alive signaling;

FIGS. 14A-14G show an example of the content of a modified cell update confirm message to convey keep-alive signaling;

FIG. 15 shows an example of the content of a modified paging type-1 message including a paging record IE for implementation of downlink client-alive (i.e., "are you there?") messaging;

FIGS. 16A and 16B show an example of the content of the paging record IE message of the of a modified paging type-1 message of FIG. 15 including a paging record IE;

FIG. 17 shows an example of the content of the paging cause IE in the paging record IE of FIGS. 16A and 16B for downlink client-alive (i.e., "are you there?") signaling;

DETAILED DESCRIPTION

Figure 1A:
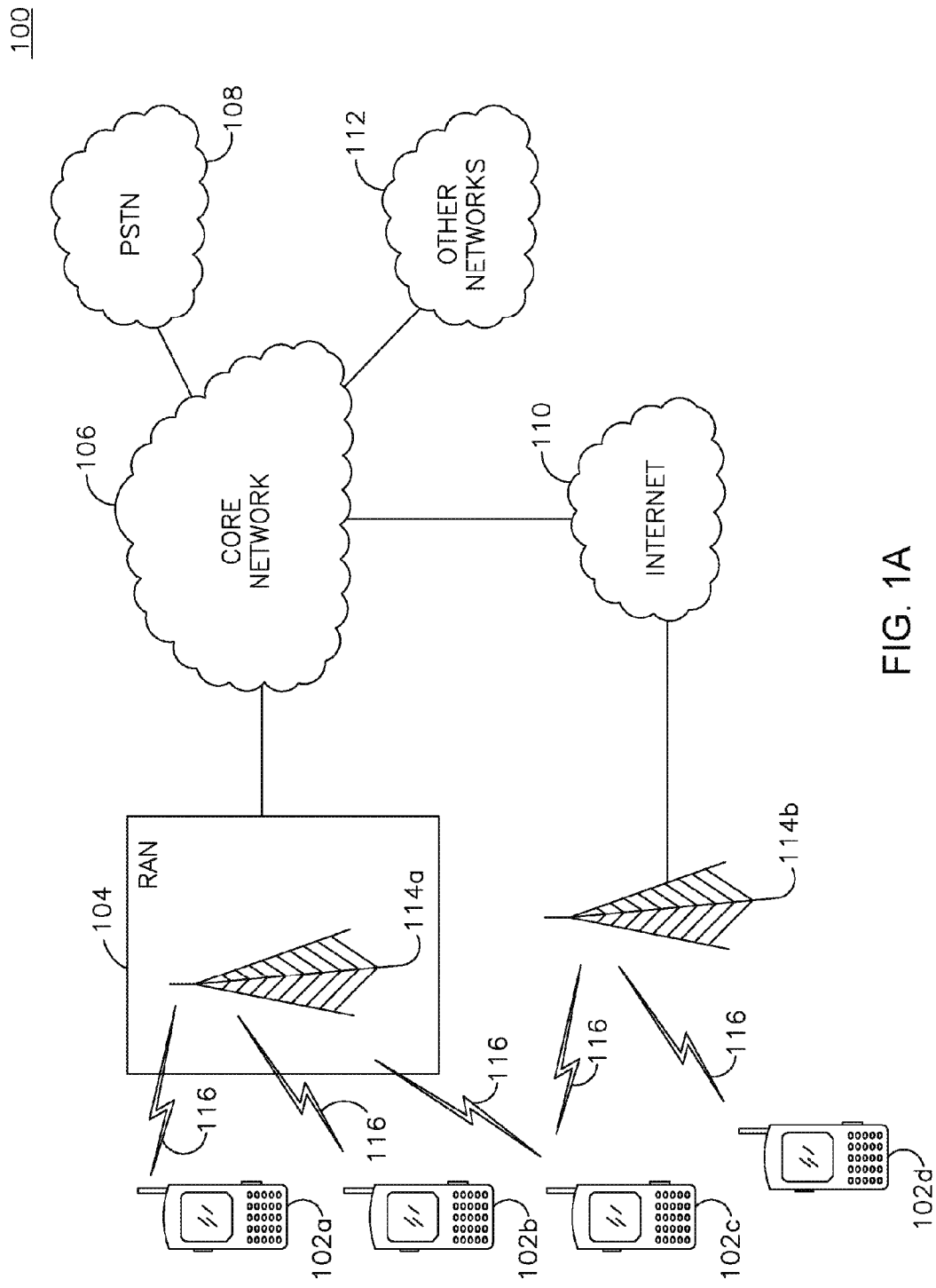
FIG. 1A shows an example communications system in which one or more disclosed embodiments may be implemented.

FIG. 1A shows an example communications system 100 in which one or more disclosed embodiments may be implemented. The communications system 100 may be a multiple access system that provides content, such as voice, data, video, messaging, broadcast, and the like, to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include WTRUs 102a, 102b, 102c, 102d, a network (e.g., radio access network (RAN)) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an evolved Node-B (eNB), a Home Node-B (HNB), a Home eNB (HeNB), a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the network 104, which may also include other base stations and/or network elements (not shown), such as a base station controller (BSC), a radio network controller (RNC), relay nodes, and the like. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link, (e.g., radio frequency (RF), microwave, infrared (IR), ultraviolet (UV), visible light, and the like). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the network 104 and the WTRUs 102a, 102b, 102c may implement a radio technology such as universal mobile telecommunications system (UMTS) terrestrial radio access (UTRA), which may establish the air interface 116 using wideband CDMA (WCDMA). WCDMA may include communication protocols such as high-speed packet access (HSPA) and/or evolved HSPA (HSPA+). HSPA may include high-speed downlink packet access (HSDPA) and/or high-speed uplink packet access (HSUPA).

In another embodiment, the base station 114a and the WTRUs 102a, 102b, 102c may implement a radio technology such as evolved UTRA (E-UTRA), which may establish the air interface 116 using long term evolution (LTE) and/or LTE-Advanced (LTE-A).

In other embodiments, the base station 114a and the WTRUs 102a, 102b, 102c may implement radio technologies such as IEEE 802.16 (i.e., worldwide interoperability for microwave access (WiMAX)), CDMA2000, CDMA2000 1x, CDMA2000 evolution-data optimized (EV-DO), Interim Standard 2000 (IS-2000), Interim Standard 95 (IS-95), Interim Standard 856 (IS-856), global system for mobile communications (GSM), enhanced data rates for GSM evolution (EDGE), GSM/EDGE RAN (GERAN), and the like.

The base station 114b in FIG. 1A may be a wireless router, HNB, HeNB, or AP, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT, (e.g., WCDMA, CDMA2000, GSM, LTE, LTE-A, and the like), to establish a picocell or femtocell. As shown in FIG. 1A, the base station 114b may have a direct connection to the Internet 110. Thus, the base station 114b may not be required to access the Internet 110 via the core network 106.

The network 104 may be in communication with the core network 106, which may be any type of network configured to provide voice, data, applications, and/or voice over Internet protocol (VoIP) services to one or more of the WTRUs 102a, 102b, 102c, 102d. For example, the core network 106 may provide call control, billing services, mobile location-based services, pre-paid calling, Internet connectivity, video distribution, and the like, and/or perform high-level security functions, such as user authentication. Although not shown in FIG. 1A, it will be appreciated that the network 104 and/or the core network 106 may be in direct or indirect communication with other RANs that employ the same RAT as the network 104 or a different RAT. For example, in addition to being connected to the network 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the Internet protocol (IP) in the TCP/IP suite. The networks 112 may include wired or wireless communications networks owned and/or operated by other service providers. For example, the networks 112 may include another core network connected to one or more RANs, which may employ the same RAT as the network 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
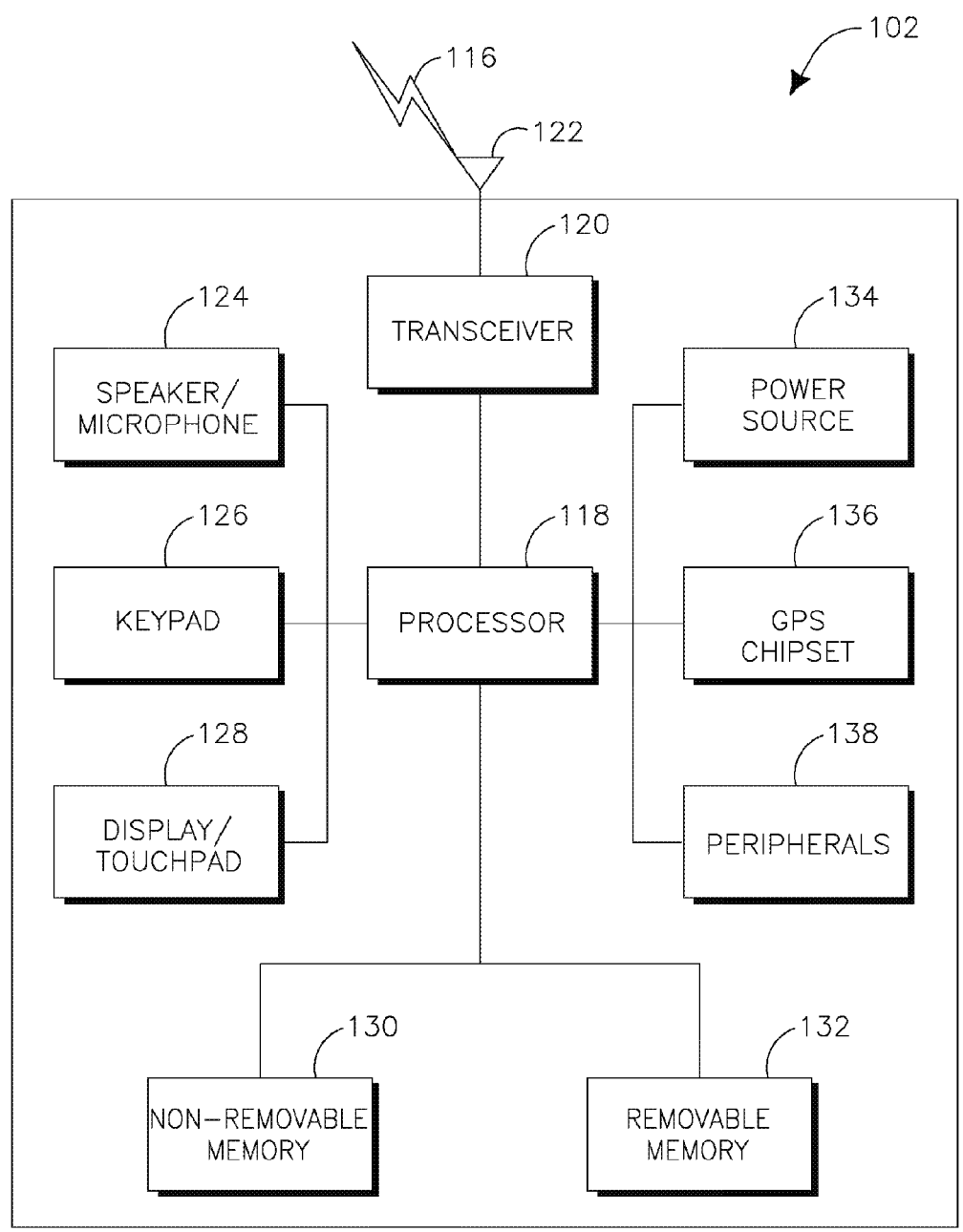
FIG. 1B shows an example wireless transmit/receive unit (WTRU) that may be used within the communications system shown in FIG. 1A.

FIG. 1B shows an example WTRU 102 that may be used within the communications system 100 shown in FIG. 1A. As shown in FIG. 1B, the WTRU 102 may include a processor 118, a transceiver 120, a transmit/receive element, (e.g., an antenna), 122, a speaker/microphone 124, a keypad 126, a display/touchpad 128, a non-removable memory 130, a removable memory 132, a power source 134, a global positioning system (GPS) chipset 136, and peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a microprocessor, one or more microprocessors in association with a DSP core, a controller, a microcontroller, an application specific integrated circuit (ASIC), a field programmable gate array (FPGA) circuit, an integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. The transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122, (e.g., multiple antennas), for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD)

memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), and the like), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station, (e.g., base stations 114a, 114b), and/or determine its location based on the timing of the signals being received from two or more nearby base stations. The WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
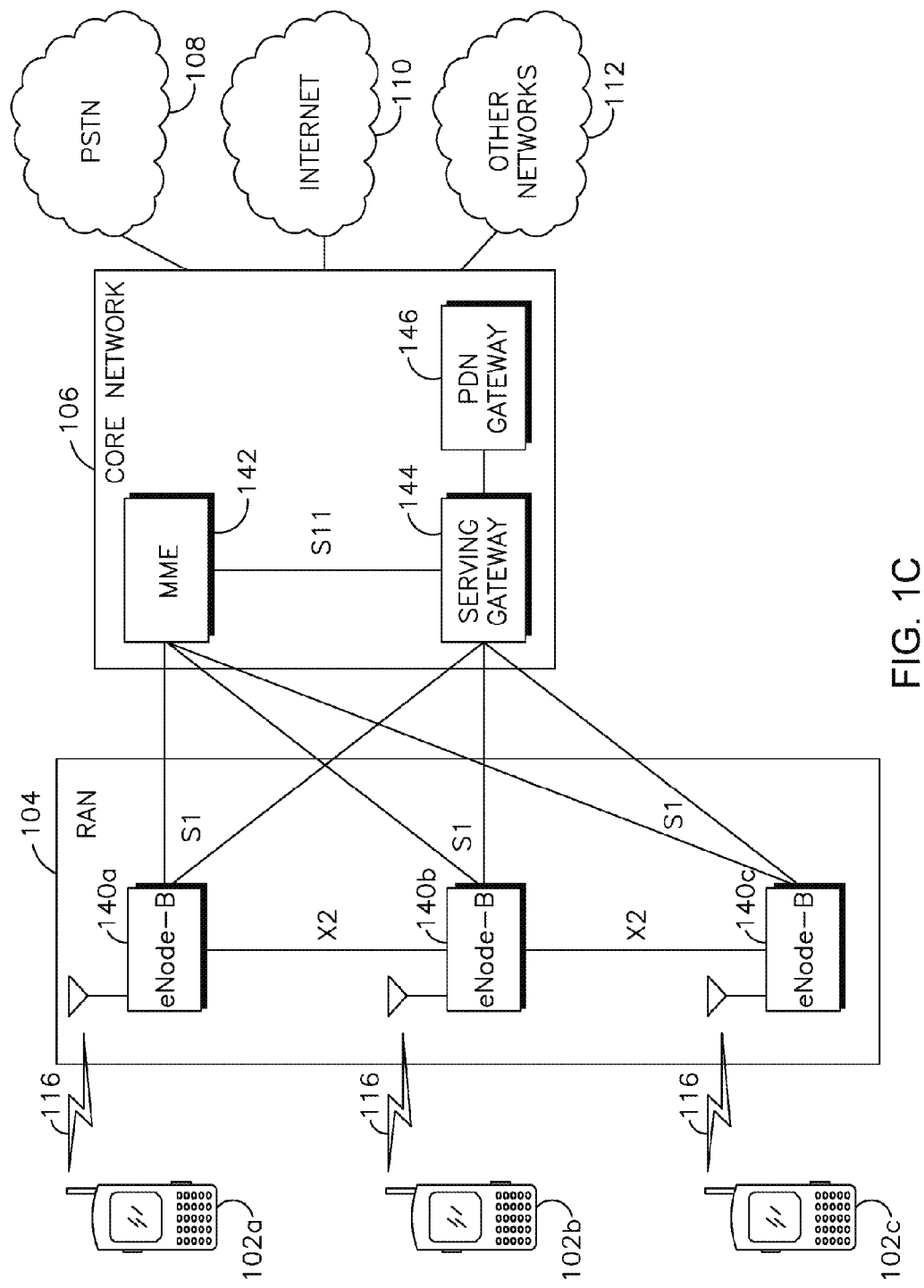
FIG. 1C shows an example network (e.g., an access stratum (AS) layer and/or non-access stratum (NAS) network), and an example core network that may be used within the communications system shown in FIG. 1A.

FIG. 1C shows an example network 104, (e.g., an access stratum (AS) layer and/or non-access stratum (NAS) network), and an example core network 106 that may be used within the communications system 100 shown in FIG. 1A. As noted above, the network 104 may employ an E-UTRA radio technology to communicate with the WTRUs 102a, 102b, 102c over the air interface 116. The network 104 may also be in communication with the core network 106.

The AS and/or NAS network 104 may be a RAN including eNBs 140a, 140b, 140c, though it will be appreciated that the network 104 may include any number of eNBs while remaining consistent with an embodiment. The eNBs 140a, 140b, 140c may each include one or more transceivers for communicating with the WTRUs 102a, 102b, 102c over the air interface 116. In one embodiment, the eNBs 140a, 140b, 140c may implement MIMO technology. Thus, the eNB 140a, for example, may use multiple antennas to transmit wireless signals to, and receive wireless signals from, the WTRU 102a.

Each of the eNBs 140a, 140b, 140c may be associated with a particular cell (not shown) and may be configured to handle radio resource management decisions, handover decisions, scheduling of users in the uplink and/or downlink, and the like. As shown in FIG. 1C, the eNBs 140a, 140b, 140c may communicate with one another over an X2 interface.

The core network 106 shown in FIG. 1C may include a mobility management entity (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNBs 140a, 140b, 140c in the network 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. As shown in FIG. 1C, the MME 142 may be connected to the serving gateway 144 via an S11 interface. The MME 142 may also provide a control plane function for switching between different networks, and may interface with a controlling node of other radio technologies, such as GSM or WCDMA.

The serving gateway 144 may be connected to each of the eNBs 140a, 140b, 140c in the network 104 via the S1 interface. The serving gateway 144 may generally route and forward user data packets to/from the WTRUs 102a, 102b, 102c. The serving gateway 144 may also perform other functions, such as anchoring user planes during inter-eNB handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway, (e.g., an IP multimedia subsystem (IMS) server), that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

WTRUs that run data applications may cause a large signaling burden on wireless networks by frequently exchanging a few bytes of data. Current wireless networks may not specifically recognize the status or keep-alive messaging at the AS and/or NAS layer, and thus may not provide for efficient handling of these messages. Methods and apparatus are described herein for improving the efficiency of handling the "always on" connectivity of these applications by optimizing the interface between the application and the wireless modem, and by efficiently handling the signaling of small data exchanges, such as status and keep-alive messages. The methods and apparatus described herein may provide for efficient handling of application layer messaging, such as status and keep-alive messages, through tight integration of the message handling within the third generation partnership (3GPP) specific layers, (e.g., AS and NAS), and an operating system (OS), leveraging many features already designed for wireless systems such as paging and idle mode.

The methods and apparatus described herein may be used in any wireless communications system where multiple applications are running including, for example, long term evolution (LTE), LTE advanced (LTE-A), IEEE 802.11, WiMax, high speed packet access (HSPA) and HSPA plus (HSPA+) networks, GSM, GPRS, WCDMA and EDGE.

Each application may generate its own presence status and keep-alive messages autonomously. As a result, the aggregate of status updates and keep-alive messages from multiple mobile data applications may cause non-negligible and frequent, (up to every 30 sec to every few minutes), background traffic even when the users are not directly interacting with the phone creating a bottleneck at the AS and/or NAS layers and access point name (APN). The number of AS and/or NAS layer signaling messages required to send the keep-alive status updates may be equivalent to the number of signaling messages required to set up a voice call.

Although the technical implications of the messages may be different and perhaps impact different network elements, the biggest difference may be that the signaling messages which precede and follow the transmission of a keep-alive message may occur as frequently as every 30 seconds while the applications are running in the background. Conversely, not even the busiest WTRU user may make 120+ voice calls every hour of every day. Furthermore, these messages may be mobile-originated or mobile-terminated, thus aggravating the impact of the status update and keep-alive messages.

When multiple applications run on a WTRU, each application may cater for its own status reporting and keep-alive messaging. A coordination function may be provided for the applications to reduce unnecessary signaling and aggregate data in an apparently seamless manner to the applications.

A WTRU's OS may be enhanced with a "wireless aware" client proxy application, together with a network counterpart referred to as the "network proxy". These entities may provide for efficient status updates and a keep-alive messaging mechanism to the application and application server, provide for application inter-operability with existing and future "wireless aware" OSs, and arbitrate amongst multiple applications to provide for their reporting and messaging needs in a coordinated, transparent and efficient manner from a radio resource usage perspective, (e.g., signaling and data traffic load). These entities may negotiate and cater to the agreed signaling rate of keep-alive messages and tolerable messaging latency for each application, and provide buffering, prioritization, queuing and exchange of data and messages to enable efficient transmission of messages, which may originate from more than one application, and thus minimize use of radio resources such as data traffic and signaling. Alternatively, the proxy entity/function may be affiliated with the communication control or with the wireless communication protocol entities.

Figure 2:
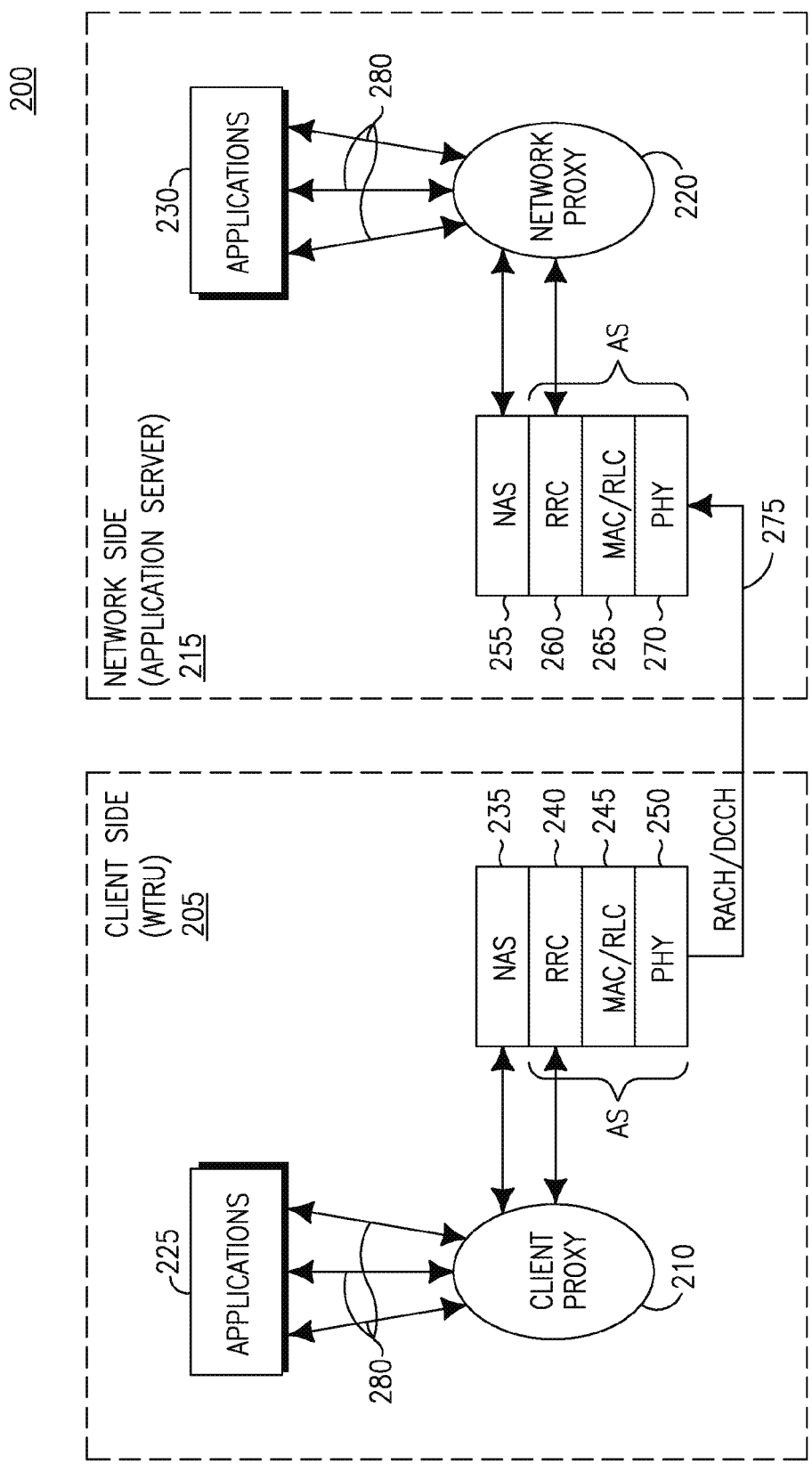
FIG. 2 shows an example of a proxy operation used in an architecture for supporting uplink (UL) "keep-alive" messages.

FIG. 2 shows an example of a proxy operation used in an architecture 200 for supporting uplink (UL) "keep-alive" messages. Efficient keep-alive messaging between a client and a network may be handled at the application layer, the AS or NAS layers. The "keep-alive" message exchange signaling rate may be requested by the WTRU and then approved by the network, based on the number of live applications, their keep-alive interval requirements (priority, urgency, delay tolerance) and the network or radio interface load conditions, etc. A proxy may be created on the client side 205 (client proxy 210) and one on the network side 215 (network proxy 220). The client proxy 210 may interface with applications 225 for a WTRU on the client side 205. The network proxy 220 may interface with applications 230 for an application server on the network side 215. The client and network proxies may maintain databases, which may include application identifiers, an indication of the requested keep-alive message period or signaling rate, time alignment requirements, delay tolerance, etc., to enable synchronization with each other so as to ensure their ability to associate client keep-alive messages with the proxy keep-alive messages, re-create the client keep-alive messages from the received proxy keep-alive messages, and distribute the client keep-alive messages to application servers.

The network proxy 220 may also reside in a base station, a serving gateway, a PDN gateway or an MME. The proxies 210 and 220 may manage a single uplink keep-alive session at the application layer, the AS layer or the NAS layer, and service the needs of the applications, the WTRU and the application server. A keep-alive indication may be communicated to the network by the WTRU, and a corresponding acknowledgement (ACK) may be received by the WTRU from the network. The client side 205 may include a protocol stack having a NAS layer 235, and an AS layer including a radio resource control (RRC) layer 240, medium access control/radio link control (MAC/RLC) layers 245 and a physical (PHY) layer 250. The network side 215 may have a protocol stack including a NAS layer 255, an RRC layer 260, MAC/RLC layers 265 and a PHY layer 270 of an AS layer. The client side 205 may communicate with the network side 215 via a random access channel (RACH)/dedicated control channel (DCCH) 275. The applications may exchange UL keep-alive messages 280 with the proxies 210 and 220, which in turn communicate with NAS layers 235 and 255, or the RRC layers 240 and 260 of the AS layers, respectively.

The proxy entity/function 210, 220 may perform the keep-alive activity with the applications/application servers and at the same time, generate the WTRU level keep-alive activity with the network proxy entity/function based on the characteristics of the application connectivity requirement and/or small data messaging needs. For example, the proxy 210 may consider the needs of several applications and propose a keep-alive message exchange rate with the network that may efficiently handle the needs for all applications. The proxy 210 may influence or request NAS or AS level protocol entities in the WTRU to interact with their network counterparts for determining the WTRU level keep-alive message exchange rate, format, data representation and particular mechanisms, etc. The proxy may also receive the network assignments on the keep-alive message exchange rate, format, data representation and particular mechanisms and perform subsequently as instructed. The proxy may generate the keep-alive message aggregating one or more application's small data messages such as presence indication and transmit these to the network via the keep-alive proxy interface to the NAS protocol or to the AS protocol layer. Alternatively, the keep-alive proxy may omit the keep-alive message and aggregate the small data messages of one or more applications, such as a presence indication, and transmit these messages to the network to provide an implied indication of "aliveness".

Figure 3:
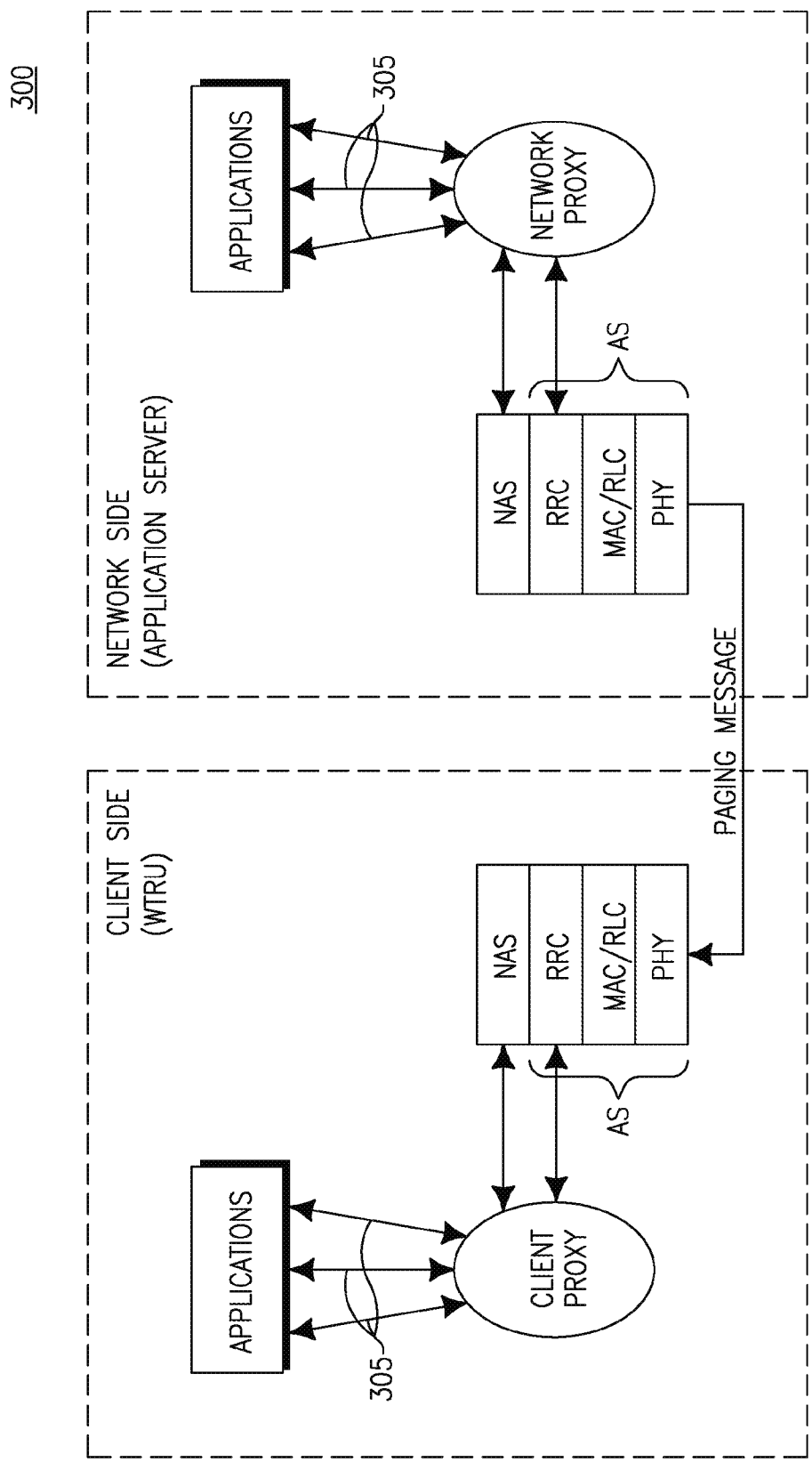
FIG. 3 shows an example of a proxy operation used in an architecture for supporting downlink (DL) "client-alive" (i.e., "are you there?") messages.

FIG. 3 shows an example of a proxy operation used in an architecture 300 for supporting DL "client-alive" (i.e., "are you there?") messages 305. When the WTRU is in idle mode, the network or network proxy may need to use a paging message to connect and send the "are you there?" inquiry to the WTRU. The client and network proxies may manage a DL "client-alive" (i.e., "are you there?") session from the network application server with a corresponding ACK back from the WTRU to the network.

Various architectural options for achieving the access layer "keep-alive" signaling may be possible. However, when the WTRU is in idle mode, the user plane connection may not be active. Therefore, in order to maintain the application layer "keep-alive" signaling, which would normally be a user plane message, the proxies may accommodate a translator function which may transform an application layer "keep-alive" data message into a control plane "keep-alive" signaling message. The control plane message may either be a NAS message or an AS message. The keep-alive message may be an information element (IE) embedded in one existing NAS/AS control message, or it may be a new NAS/AS message. This may maintain the perceived persistent data connection for the "idling" application, but at the same time minimize the access layer transitions into activating and deactivating a user plane connection.

As shown in FIGS. 2 and 3, the client and network proxies may interface with at least one of an AS (RRC) layer or a NAS layer. When interfacing with an AS (RRC) layer of a protocol stack, the network proxy and AS (RRC) layer may reside in an evolved Node-B (eNB), (i.e., a network node), so that the keep-alive message may be transmitted by the WTRU as a control message, and then be forwarded to an application server on the network side as a data message. Likewise, when interfacing with the NAS layer of a protocol stack, the network proxy and NAS layer may reside in a mobility management entity (MME), (i.e., a network node). Furthermore, the MME may need to know the location of the network proxy to be able to deliver keep-alive messages, (i.e., an access layer heartbeat), using the control plane. Based on the concepts introduced herein, not all keep-alive messages need to be delivered. Once a context is established between the client proxy and the network proxy, then these proxies may act on behalf of the client (i.e., the WTRU) and the network (i.e., network node) to maintain the heartbeat.

In addition, in order to determine whether proxy functionality may be needed, (e.g., for legacy applications), the client proxy may identify the keep-alive signals by analyzing AT commands that generate the connections.

Figure 4:
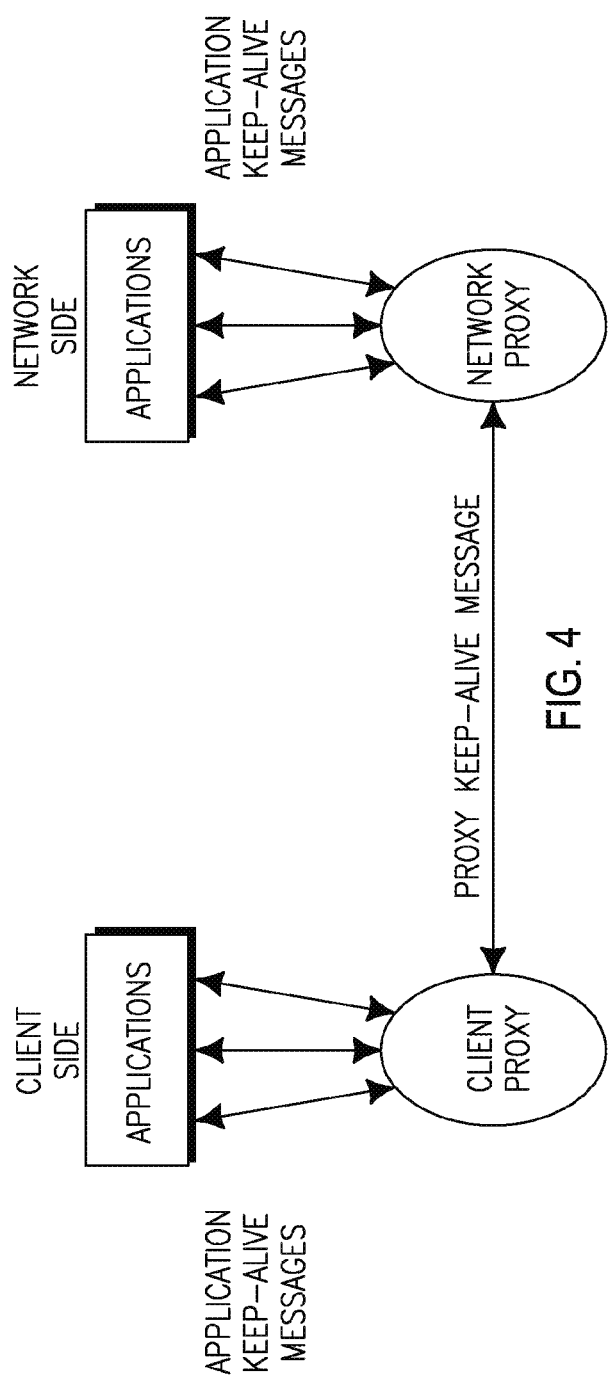
FIG. 4 shows an example of a proxy operation for supporting specific message formatting.

When an application configures itself, it may request or negotiate with the operating system on the WTRU for the signaling rate of the keep-alive messaging, tolerable latency for message communication and application priority handling. To ensure that the application is operating properly, the client proxy in the operating system may receive the incoming keep-alive messages that may be generated by the application and generate a single AS and/or NAS layer signaling messages at the most frequently transmitted keep-alive message rate, thus reducing the effective number of transmitted messages across the air interface. The specific keep-alive data message format may be captured during the application registration process with the operating system. The client proxy may translate the specific keep-alive message formats for all applications into an AS and/or NAS layer signaling message that may be translated by the network proxy back to the specific application layer format. As an illustration of this concept, FIG. 4 shows an example of proxy operation for supporting specific message formatting.

The client proxy may provide an interface to the OS functions used in the WTRU so as to cater for legacy applications and also new "wireless aware" applications. The interface may cater for logging of the application and a unique application identifier (ID) such as its corresponding process identifier (PID), together with preferences such as latency, keep-alive signaling rate (i.e., frequency), and/or process priority handling etc. The network proxy may also cater to the application server in a similar manner. The proxies may need to establish and maintain synchronization of a database of application IDs containing status information etc.

Wireless networks may already provide for an efficient mechanism to handle a low power connected state known as idle mode operation. When a mobile is in this mode, it is capable of listening to the network for messages such as an incoming call, for example. This mechanism may be used as the basis of an AS and/or NAS layer keep-alive message. For example, in idle mode, the combination of location (or tracking area) update mechanisms and paging channel monitoring provide an ideal vehicle for relaying keep-alive status information between the mobile and network.

By way of an example, in UMTS networks, a typical transition of RRC states from an idle cell (IDLE) state to a dedicated channel cell (CELL_DCH) state may generate up to 30 signaling messages to complete. These signals may include connection setup, authentication and dedicated radio bearer setup. Using CELL_DCH to transmit small data packets such as a keep-alive message may be inefficient. However, the transition from paging channel cell (CELL_PCH) to a forward access channel cell (CELL_FACH) may use only 12 messages since a full RRC connection and authentication may not be necessary.

In LTE, there are two RRC states: 1) RRC_Idle where the WTRU is not active, but an ID is assigned and tracked by the network; and 2) RRC_Connected where active radio operation is performed with context in an eNodeB (i.e., a base station). FIG. 5 shows an example of the RRC states in LTE.

The connected mode may measure, transmit and receive data. The idle state may handle cell reselection, network selection and paging. The transition from RRC_Idle to RRC_Connected may generate anywhere from 12 to 30 messages, depending on the type of connection established. Keeping the WTRU in a connected state, (e.g., CELL_PCH in UMTS and in discontinuous reception (DRX) mode of LTE), such that the WTRU does not need to perform an RRC connection or an authentication to reduce the signaling overhead.

Furthermore, in connected mode, it may be possible to define an upper layer application message (e.g. SMS or define other message that would go on the control plane (C-plane)) for the keep-alive such that the RRC UL/DL-direct-transfer message may carry it over the signaling link (i.e. the C-plane). According to another embodiment, the proxy function may be used to transmit keep-alive messages to the application server when an application is enabled and the radio is not in idle mode. Thus, there may be active data transmissions occurring on the WTRU. The proxy function may use, as an alternative, the data connection already in use to transmit the keep-alive message on the user plane instead of the control plane.

Finally, another option may be to link the client-alive (i.e., "are you there?") message to the keep-alive message. Reception of the "are you there?" message may trigger the WTRU to send a keep-alive message. This is good for LTE such that the DL message may carry an uplink grant for the UL keep-alive message sent over the air interface (does not exclude that each direction is independent) avoiding the WTRU to apply for serving grant.

FIG. 6 shows an example of buffering of data messages by the proxy function as application APP #1 is sending data messages more frequently than idling APP #2. The overall proxy keep-alive message signaling rate may be driven by APP #2 and the messages received from APP #1 may be received between the first and second keep-alive messages of APP #2. The data messages for APP #1 may be buffered until the next proxy keep-alive message is sent. The data messages may then be concatenated into a single payload that is included in the keep-alive message that may be parsed and redistributed on the network side.

A registration process may be implemented between the client proxy and the network proxy to populate a database on the WTRU and network sides, which may maintain synchronization of the keep-alive messages. For example, an application that is assigned a process identifier (PID) may be identified by its PID at the WTRU and network sides so that, when a keep-alive signal is parsed by the WTRU, it may be re-created on the network side. Thus, a keep-alive signal may be re-created just as it originated at the WTRU, inclusive of any other data included in the keep-alive message. The sending of messages may be controlled, for example, by the expiry of a timeout period, or determined from the latency tolerable per application.

Graceful degradation may be achieved under peak demand conditions. When the demand rises for radio resources in a cell, the network side proxy function may gracefully extend the keep-alive period and delay tolerance temporarily. Most applications may have the ability to reconfigure and tolerate the reduction in the keep-alive message signaling rate.

WTRU-originated keep-alive messaging may be used. In this case, the WTRU may be in an idle mode and desire to send a keep-alive message to the network application server. The network proxy, upon receiving this message logs that the mobile is still connected and responds with an acknowledgement message. The WTRU may receive the acknowledgement and then, based upon the agreed upon keep-alive signaling rate for each application, may service each application's keep-alive frequency accordingly. The network proxy, upon receipt of the keep-alive message, may complete the keep-alive message service to one or more application servers.

Furthermore, if there are messages actively being sent and received by the WTRU then they substitute for the keep-alive intent and so the keep-alive may be omitted for that instance. The network proxy may be informed of active messages if the WTRU is registered with the network, regardless of whether or not they contain keep-alive messages. Similarly, the client proxy may have to manage the scenario where no keep-alive message is actually sent, but the intent is fulfilled to maintain the keep-alive monitoring at the application level.

The handling of the proxy keep-alive function via the AS or NAS layer signaling may be implemented in various methods.

In one method, the client and the network may maintain a common database of information registered by applications, such as an application ID, (e.g., OS process ID), keep-alive timing information, latency, tolerance, etc. In this method, a single bit carried in either a NAS or AS layer message may convey proxy keep-alive signaling. The corresponding proxy may refer to the database in order to regenerate the appropriate keep-alive application server message.

In another method, the AS or NAS layer messages may be used to send a keep-alive bit indication and other additional information, (e.g., the process ID, etc,), that may have been contained in the database as part of the application registration. This method may enable regeneration of the corresponding keep-alive application server message without the need to reference a database.

Another method may combine features of the two methods mentioned above.

The signaling messages may be used at the AS and/or NAS layer to carry the keep-alive messaging. For example, a low overhead messaging mechanism may be implemented to utilize unused fields in existing protocol messages such as an attach request message or an attach reject message, an RRC connection request message or RCC connection reject message, a modified routing area update (RAU) message for keep-alive, or a cell update message or cell update confirm message. All of these messages may be used for a WRTU in idle mode or connected mode, whereby an efficient mechanism using minimal signaling is already utilized for other radio operations. This mechanism may provide a specific signaling mechanism for providing keep-alive signaling. In particular, spare information fields may be defined to carry the keep-alive signaling. Specific examples for such mechanisms are described below. Although the following mechanisms are described for an LTE system, similar mechanisms may be developed for other systems, such as HSPA, WCDMA, EDGE, GSM/GPRS, WLAN, etc.

The addition of new information elements (IEs) to AS (RRC) and NAS messages may be backwards compatible with older WTRUs. Therefore, later releases may require specific release extensions for compatibility. Furthermore, coding of the new IEs may require the addition of an appropriate options flag to the beginning of the message if an IE is determined to be an optional element. Finally, additions to enumerations may be allowed if the additional enumeration does not require additional bits for coding.

In one example, a NAS attach request message may be modified for keep-alive signaling.

FIG. 7A shows an example of the content of a modified attach request NAS message including an evolved packet system (EPS) attach type information element 705 configured to convey the keep-alive signaling. The attach request message may be a signaling message that includes an EPS attach type field used by the network for bearer establishment.

FIG. 7B shows an example of the content of the EPS attach type IE 705 including keep-alive bits 710. The network proxy may read the keep-alive message field and re-create the proxy keep-alive message and the appropriate keep-alive message for registered applications to relay to their application servers.

FIG. 7C shows an example of the content of a NAS attach reject message including an EPS mobility management (EMM) cause IE 715 configured to convey keep-alive signaling ACK. The EPS reject message may be sent by the network rejecting the request for bearer establishment based on a number of possible causes.

FIG. 7D shows an example of a cause value 720 of the EMM cause IE of the EMM cause IE 715.

FIG. 7E shows an example of bits of the cause value 720 including keep-alive ACK bits 725. This implementation may include the addition of new bit mapping for the EPS attach type to indicate a keep-alive message. The reception of an attach request message with a keep-alive attach type may trigger an attach reject message from the network side with a newly defined evolved packet system connection management (EMM) cause of a "KeepAlive-ACK", and the attach reject message with the newly defined EMM cause option may serve as an ACK to the client proxy indicating that the keep-alive was received by the network proxy. The EMM cause IE 715 may indicate the reason why an EMM request from the WTRU was rejected by the network. The EMM cause may be a type 3 IE having a length of 2 octets.

In another example, an AS layer RRC connection request message may be modified for keep-alive signaling. The AS layer RRC connection request message may be the first message transmitted by the WTRU when setting up an RCC connection with a network. FIGS. 8A-8D show an example of the content of a modified AS layer RRC connection request message including an establishment cause IE 805 to convey keep-alive signaling (see FIG. 8A). FIGS. 8A-8D illustrate the additions to the AS layer RRC connection request message as a method of indicating keep-alive status at the AS layer with few modifications.

FIG. 9 shows an example of the content of the establishment cause IE 805 of FIG. 8A. As shown in FIG. 9, the establishment cause IE may include an additional enumerated element referred to as a mobile operator (MO)-KeepAlive field 905. Reception of the MO-KeepAlive field 905 by the network may trigger the network to transmit an AS layer RRC connection reject message to the WTRU with a new rejection cause enumeration value corresponding to "unspecified". An additional enumeration in this field may not be an option as the encoding may require an additional bit to support it, and thus it may not be backwards compatible. The connection reject with the "unspecified" rejection cause may serve as an ACK to the client proxy indicating that the keep-alive was received by the network proxy.

FIG. 10 shows an example of the content of an AS layer RRC connection reject message including a rejection cause IE 1005 to convey keep-alive signaling, and FIG. 11 shows an example of the content of the rejection cause IE 1005.

In another example, a routing area update (RAU) request message may be modified for keep-alive signaling.

FIG. 12 shows an example of the content of a modified RAU request message including a keep-alive status IE 1205 to convey keep-alive signaling. In UMTS, the RAU request message may either be sent in a "periodic" sense or when the WTRU moves into a new routing area and needs to notify the network. The keep-alive status IE 1205 may be added to the RAU message as a new keep-alive status message field. Reception of the keep-alive status IE 1205 by the network may trigger a new IE corresponding to "KeepAlive-ACK". The keep-alive confirmation with the new IE may serve as an ACK to the client proxy indicating that the keep-alive was received by the network proxy. All of the area update messages, (e.g., local area update (LAU), RAU, tracking area update (TAU)), may be applicable.

In another example, a cell update message may be modified for keep-alive signaling.

FIGS. 13A-13C show an example of the content of a modified cell update message including an establishment cause IE 1305 to convey keep-alive signaling. The establishment cause type may be the same IE type as shown in FIG. 9.

FIGS. 14A-14G show an example of the content of a modified cell update confirm message including a "KeepAlive_ACK" 1405 (see FIG. 14G) to acknowledge the reception of the keep-alive signaling by the network proxy. This implementation may include the modification of the establishment cause IE to include an additional enumerated element called MO-KeepAlive field. Reception of the MO-KeepAlive field by the network may trigger a cell update confirm message with a new IE corresponding to "KeepAlive-ACK". The cell update confirm message with the new IE may serve as an ACK to the client proxy indicating that the keep-alive was received by the network proxy.

In another example, mobile terminated client-alive (i.e., "are you there?") messaging may be used. Signaling messages at the AS and/or NAS layer may be used to carry the client-alive message information. In this case, the WTRU may be in an idle mode or a connected mode, and the network client may desire to send a client-alive message to the mobile so the network proxy may send a proxy client-alive message to the WTRU. Upon receiving the client-alive message, the client proxy may send an ACK back to the network proxy to complete the client-alive message service to the application servers.

Since the communication between the network application servers and the WTRU may be conducted over a user plane, the network proxy may also communicate with a serving gateway, which may trigger the client-alive message towards the MME, similar to a "downlink data notification" message that triggers paging and may be modified as well to send the client-alive message.

Also, a message may exist between a home subscriber server (HSS) and an MME that is configured to allow the HSS to provide an indication to a "service-relate entity" about the WTRU reachability on the EPS. A WTRU-reachability-notification-request message may be sent from the HSS to the MME. Therefore, if the network proxy is the "service-related entity", it may use this message in lieu of the client-alive message. Additionally, a paging type-1 message may also be modified to send the client-alive message.

In another example, a paging type-1 message for client-alive signaling may be used.

FIG. 15 shows an example of the content of a modified paging type-1 message including a paging record IE 1505 for implementation of downlink client-alive messaging. The paging record IE may be used by the WTRU to indicate a request for network communication.

FIGS. 16A and 16B show an example of the content of the paging record IE 1505 including a paging cause IE 1605 and a new client-alive (i.e. "are you there?") IE 1610 for implementation of the downlink client-alive messaging. FIG. 17 shows an example of the content of the paging cause IE 1605 of message in the paging record IE 1505. A paging message may be modified to carry a client-alive indication to at least one WTRU by, for example, adding a new cause to a paging cause so that the WTRUs may know that the paging is for signaling a client-alive indication. An "are you there?" information IE 1610 may be added to the paging record IE 1505 of the paging type-1 message.

When the WTRU receives the "are you there?" information IE 1610 while in an idle mode, for each occurrence of the IE "paging record" included in the message, the WTRU may perform the following:
  1> if the IE "used paging identity" is a core network (CN) identity:
    2> compare the IE "WTRU identity" with all of its allocated CN WTRU identities:
    2> if one match is found:
      3> if the paging cause is "are you there?" and the "are you there?" IE is present, forward to the client proxy the received "keep-alive information";
      3> Otherwise treat the paging as a normal paging type-1 message;
  1> otherwise:
    2> ignore that paging record.

Note that the network proxy may coordinate the client-alive indications from various application servers over the network for a particular WTRU before the paging type-1 message may be delivered to the WTRU with the appropriate WTRU-ID. Similar treatment may be applicable to LTE paging.

In another example, status and small packet data buffering may be used. Spare bits or bandwidth in the keep-alive messaging may be used to communicate additional data as the opportunity arises, such as status or presence messages, (location update or signing on or off an application). A buffer may be maintained for these messages.

A proxy function may utilize short messaging service (SMS) features of the cellular network. A generic transparent proxy container may be used to communicate additional status and/or presence messages to the application servers.

Buffering, prioritization, queuing and exchange of data may be performed. The proxy function may reduce unnecessary messaging associated with the applications related to keep-alive messaging. Since the transmission of data may not be synchronized between applications, the proxy function may buffer, aggregate and prioritize messages as they are received. Where the application registration may suggest that a certain message transmission delay is tolerable, further optimization may be achieved within the framework of the keep-alive signaling.

Figure 18:
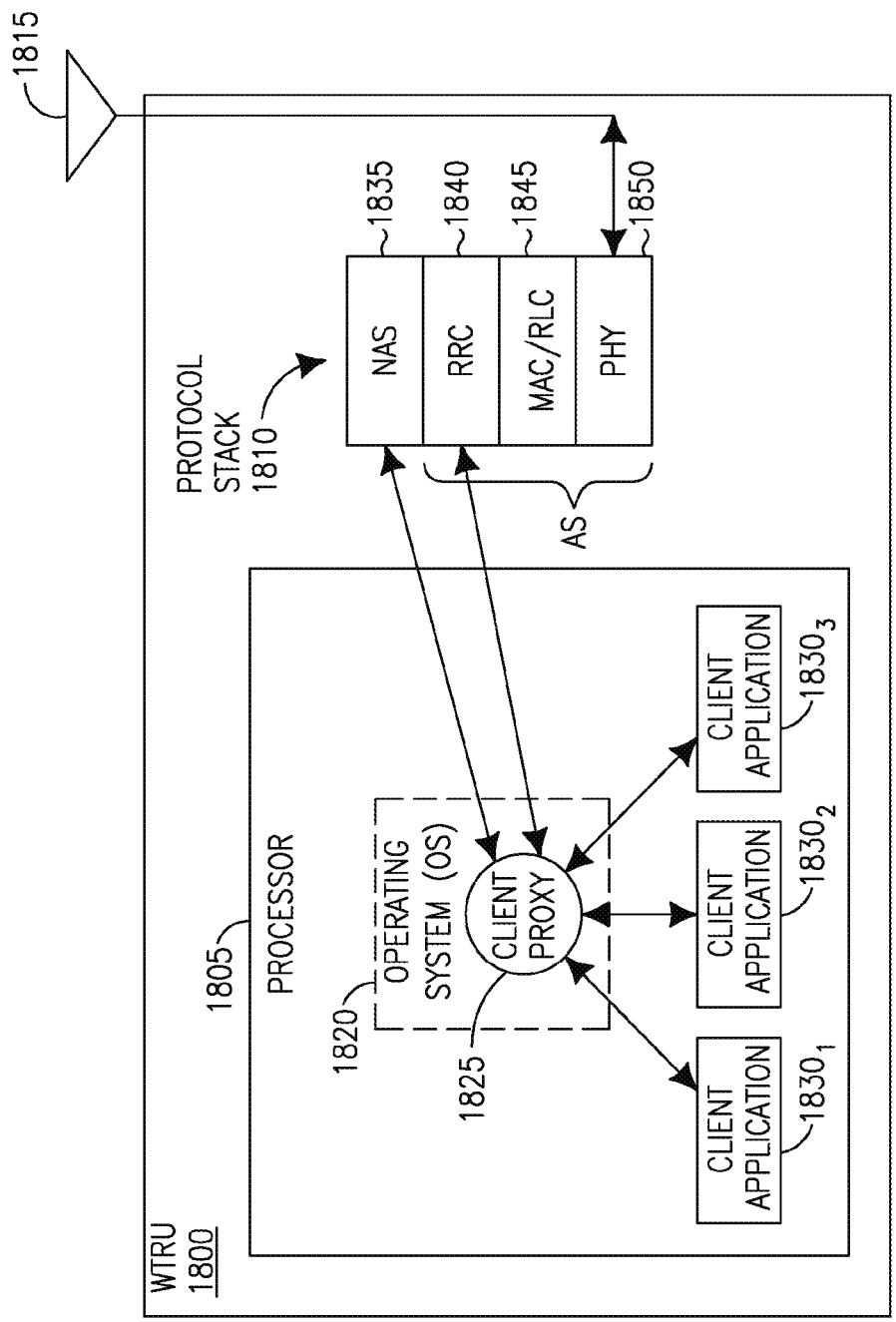
FIG. 18 shows an example block diagram of a WTRU configured to maintain communications connectivity for a plurality of applications and reduce unnecessary AS and NAS layer message transmissions.

FIG. 18 shows an example block diagram of a WTRU 1800 configured to maintain communications connectivity for a plurality of applications and reduce unnecessary message transmissions. The WTRU 1800 may include a processor 1805, a protocol stack 1810 and at least one antenna 1815. The processor 1805 may have an OS 1820 including a client proxy 1825, and a plurality of client applications $1830_1$, $1830_2$ and $1830_3$. The protocol stack 1810 may include a NAS layer 1835, and an RCC layer 1840, MAC/RLC layers 1845 and a PHY layer 1850 of an AS layer. The client proxy 1825 may be provided to interface with the client applications $1830_1$, $1830_2$ and $1830_3$ and the protocol stack 1810. Each of the client applications $1830_1$, $1830_2$ and $1830_3$ may send keep-alive messages at a respective signaling rate. Each of the client applications $1830_1$, $1830_2$ and $1830_3$ may register with the client proxy 1825 and indicate a respective keep-alive message signaling rate. The client proxy 1825 may determine an optimal signaling rate based on the respective keep-alive message signaling rates indicated by the client applications $1830_1$, $1830_2$ and $1830_3$. The client proxy 1825 may generate an application layer proxy keep-alive message associated with the client application keep-alive messages, and forward the application layer proxy keep-alive message to at least one of the NAS layer 1835 or the RRC of the AS layer 1840 of the protocol stack 1810. The protocol stack 1810 may transmit the application layer proxy keep-alive message via the at least one antenna 1815 at the optimal signaling rate.

Figure 19A:
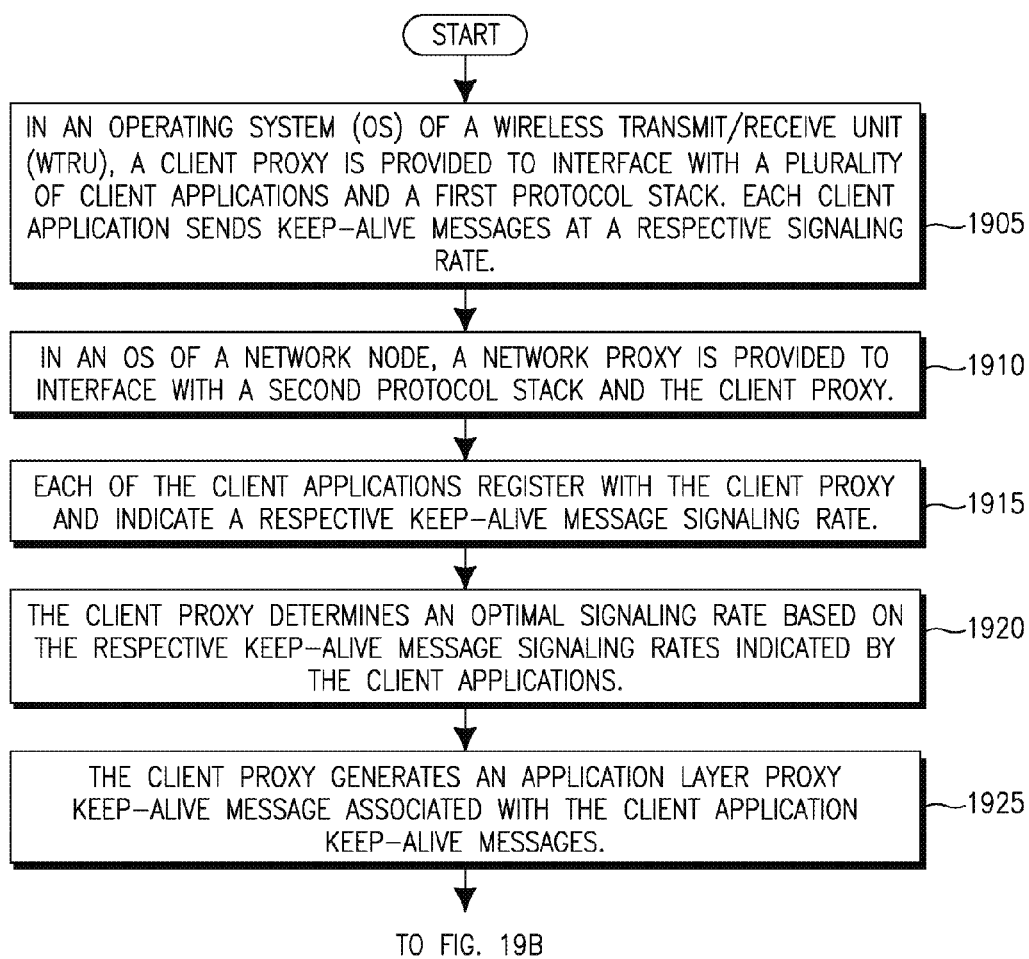
FIGS. 19A and 19B, taken together, are a flow diagram of a procedure for a WTRU to maintain communications connectivity for a plurality of applications that send keep-alive messages and to reduce unnecessary message transmissions.
Figure 19B:
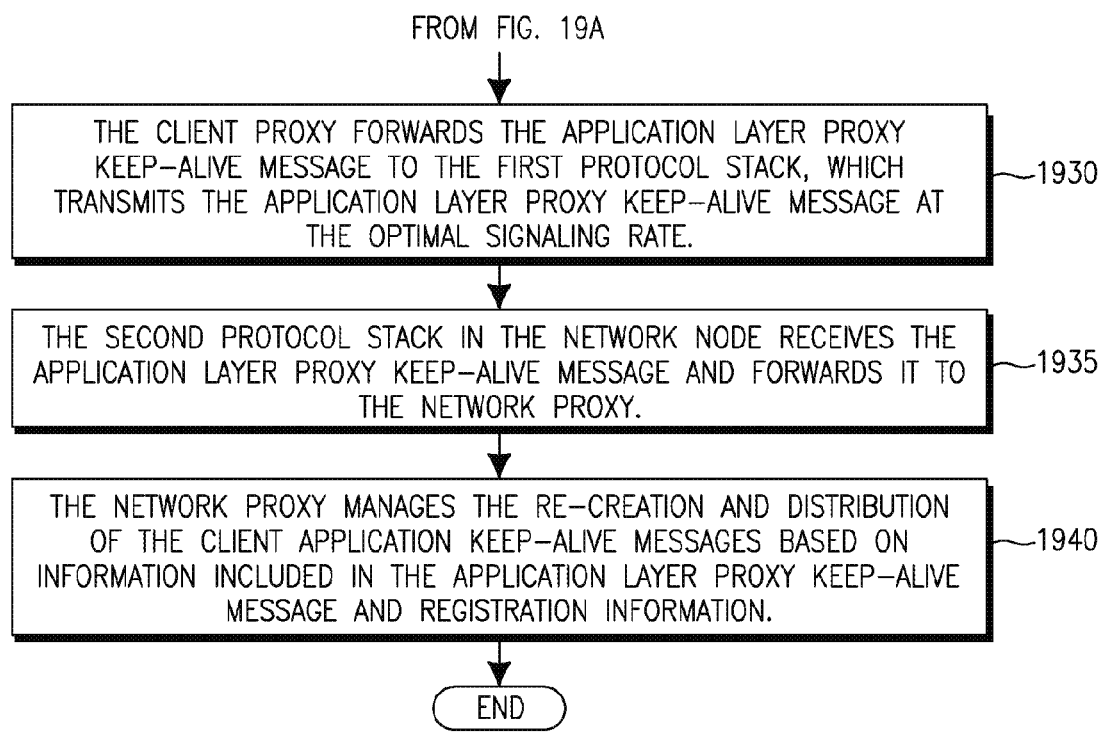

FIGS. 19A and 19B, taken together, are a flow diagram of a procedure 1900 for a WTRU to maintain communications connectivity for a plurality of applications that send keep-alive messages and to reduce unnecessary message transmissions.

As shown in FIG. 19A, a client proxy in an OS of the WTRU may be provided to interface with a plurality of client applications and a first protocol stack (1905). Each client application may send keep-alive messages at a respective signaling rate. A network proxy in an OS of a network node may be provided to interface with a second protocol stack and the client proxy (1910). Each of the client applications may register with the client proxy and indicate a respective keep-alive message signaling rate (1915). The client proxy may determine an optimal signaling rate based on the respective keep-alive message signaling rates indicated by the client applications (1920). The client proxy may generate an application layer proxy keep-alive message associated with the client application keep-alive messages (1925).

As shown in FIG. 19B, the client proxy may forward the application layer proxy keep-alive message to the first protocol stack, which may transmit the application layer proxy keep-alive message at the optimal signaling rate (1930). The second protocol stack in the network node may receive the application layer proxy keep-alive message and forward it to the network proxy (1935). The network proxy may manage the re-creation and distribution of the keep-alive messages based on information included in the application layer proxy keep-alive message and registration information (1940).

The client proxy may transform the application layer proxy keep-alive message into an AS layer message, and forward the AS layer message to the first protocol stack. The first protocol stack may transmit the AS layer message at the optimal signaling rate.

The client proxy may transform the application layer proxy keep-alive message into NAS layer message, and forward the NAS layer message to the first protocol stack. The first protocol stack may transmit the NAS layer message at the optimal signaling rate.

The first protocol stack may receive a positive acknowledgement (ACK) message indicating that the application layer proxy keep-alive message was received. The first protocol stack may forward the ACK message to the client proxy. The client proxy may forward the ACK message to the client application according to their respective keep-alive message signaling rates.

The client proxy may interface with at least one of an AS layer (RRC) and a NAS layer of the first protocol stack.

The network proxy may interface with at least one of a NAS layer or an AS layer (RRC) of the second protocol stack. The network proxy and the second protocol stack may reside in an MME. The client proxy may embed additional data into the application layer proxy keep-alive message.

The client proxy may generate an application layer proxy keep-alive message at a keep-alive message signaling rate associated with a greatest common divisor time for time periods or time intervals associated with the registered keep-alive message signaling rate. Alternatively, the client proxy may generate keep-alive messages at a signaling rate that may optimize the transmissions needed to accommodate each of the client applications. The registration may be implicit, for example, by inferring from a stream of keep-alive messages sent by an application. Alternatively, the registration may be explicit, for example, by an application registering such information with the client proxy when the application is activated.

The client proxy and the network proxy may use a plurality of identifiers and message fields associated with the client applications to recreate and distribute each client application keep-alive message.

The client proxy and the network proxy may manage a commonly shared uplink proxy keep-alive session at an AS or NAS layer. The client proxy may translate a specific proxy keep-alive message format into an AS or NAS layer message, and transmit the AS or NAS layer message to the network proxy. The network proxy may translate the AS or NAS layer message back to the specific proxy keep-alive message format.

The client proxy may capture a specific application keep-alive message format while registering a client application, and translate the specific keep-alive message format into an application, AS or NAS layer message. The client proxy may transmit the application, AS or NAS layer message to the network proxy. The network proxy may translate the application, AS or NAS layer message back to the specific keep-alive message format. The network proxy may register the specific keep-alive message format for the application.

Figure 20A:
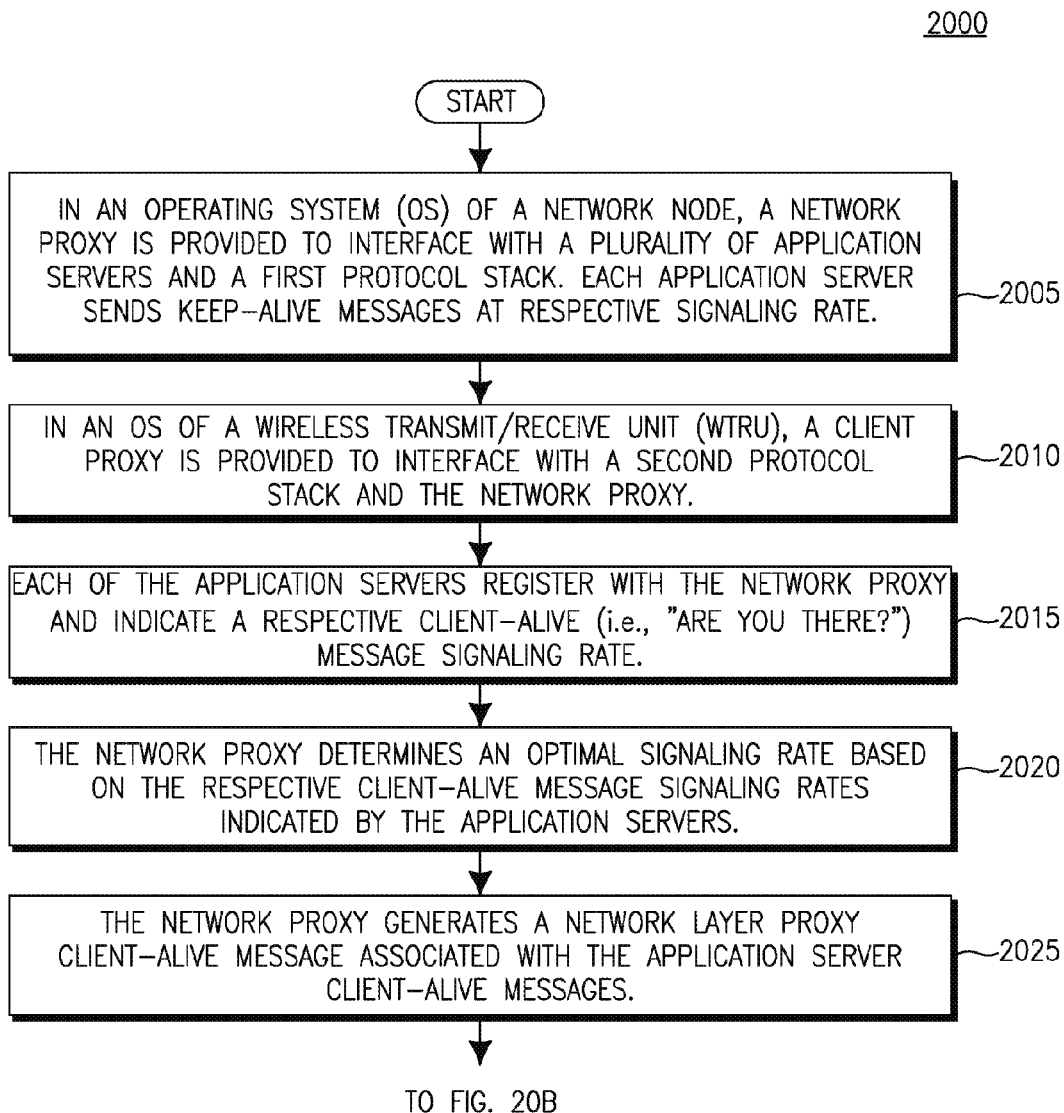
FIGS. 20A and 20B, taken together, are a flow diagram of a procedure for a network node to maintain communications connectivity for a plurality of application servers that send client-alive messages and to reduce unnecessary message transmissions.
Figure 20B:
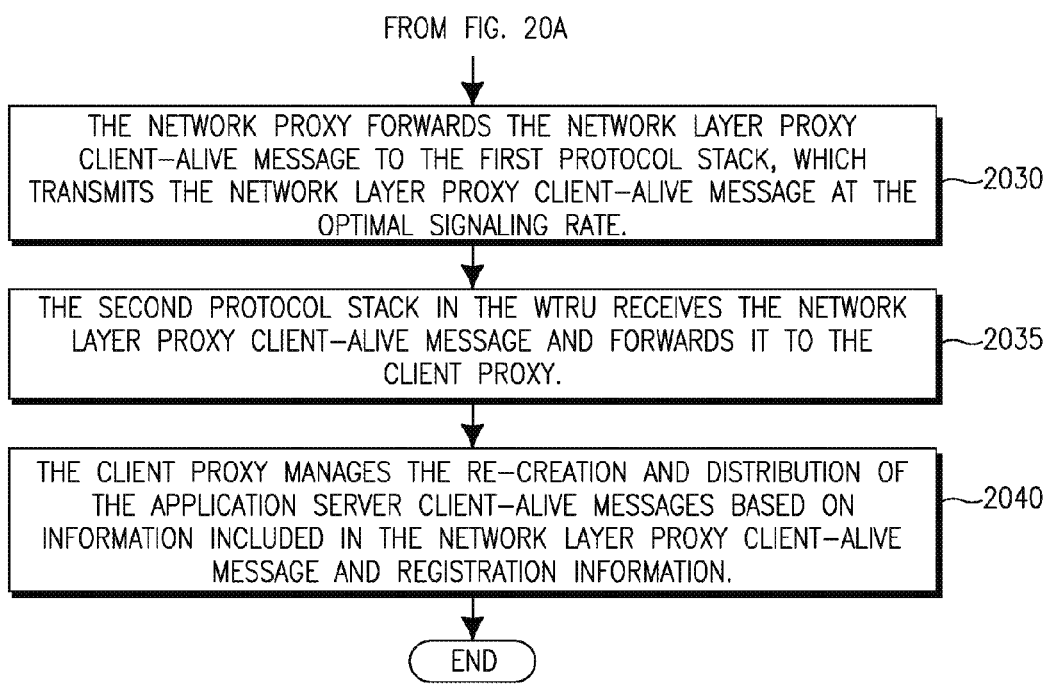

FIGS. 20A and 20B, taken together, are a flow diagram of a procedure 2000 for a network node to maintain communications connectivity for a plurality of application servers that send client-alive messages and to reduce unnecessary message transmissions.

As shown in FIG. 20A, a network proxy in an OS of the network node may be provided to interface with a plurality of application servers and a first protocol stack (2005). Each of the application servers may send keep-alive messages at a respective signaling rate. A client proxy in an OS of a WTRU may be provided to interface with a second protocol stack and the network proxy (2010). Each of the application servers may register with the network proxy and indicate a respective client-alive (i.e., "are you there?") message signaling rate (2015). The network proxy may determine an optimal signaling rate based on the respective client-alive message signaling rates indicated by the application servers (2020). The network proxy may generate a network layer proxy client-alive message associated with the client-alive messages (2025).

As shown in FIG. 20B, the network proxy may forward the network layer proxy client-alive message to the first protocol stack, which may transmit the network layer proxy client-alive message at the optimal signaling rate (2030). The second protocol stack in the WTRU may receive the network layer proxy client-alive message and forward it to the client proxy (2035). The client proxy may manage the re-creation and distribution of the application server client-alive messages based on information included in the network layer proxy client-alive message and registration information (2040).

The network proxy and the client proxy may manage a commonly shared downlink proxy client-alive session at an AS or NAS layer. The network proxy may translate a specific proxy client-alive message format into an AS or NAS layer message. The network proxy may transmit the AS or NAS layer message to the client proxy. The client proxy may translate the AS or NAS layer message back to the specific proxy client-alive message format.

The network proxy may capture a specific application client-alive message format while registering a network application. The network proxy may translate the specific client-alive message format into an AS or NAS layer message. The network proxy may transmit the AS or NAS layer message to the client proxy. The client proxy may translate the AS or NAS layer message back to the specific client-alive message format.

Although features and elements are described above in particular combinations, one of ordinary skill in the art will appreciate that each feature or element may be used alone or in combination with any of the other features and elements. In addition, the embodiments described herein may be implemented in a computer program, software, or firmware incorporated in a computer-readable medium for execution by a computer or processor. Examples of computer-readable media include electronic signals, (transmitted over wired or wireless connections), and computer-readable storage media. Examples of computer-readable storage media include, but are not limited to, a read only memory (ROM), a random access memory (RAM), a register, a cache memory, a semiconductor memory device, a magnetic media, (e.g., an internal hard disc or a removable disc), a magneto-optical media, and an optical media such as a compact disc (CD) or a digital versatile disc (DVD). A processor in association with software may be used to implement a radio frequency transceiver for use in a WTRU, UE, terminal, base station, Node-B, eNB, HNB, HeNB, AP, RNC, wireless router or any host computer.

What is claimed is:

1. A method of a wireless transmit/receive unit (WTRU) maintaining communications connectivity for a plurality of applications and reducing unnecessary message transmissions, the method comprising:
   providing a client proxy to interface with a plurality of client applications and a first protocol stack, wherein the WTRU contains the plurality of client applications, the client proxy, and the first protocol stack, and wherein each of the client applications sends keep-alive messages at a respective signaling rate;
   each of the client applications registering with the client proxy and indicating a respective keep-alive message signaling rate;
   the client proxy determining an optimal signaling rate based on the respective keep-alive message signaling rates indicated by the client applications;
   the client proxy generating an application layer proxy keep-alive message associated with the client application keep-alive messages;
   the client proxy forwarding the application layer proxy keep-alive message to the first protocol stack;
   the first protocol stack transmitting the application layer proxy keep-alive message at the optimal signaling rate;
   providing a network proxy in a network node to interface with a second protocol stack and the client proxy;
   the second protocol stack receiving the application layer proxy keep-alive message and forwarding the application layer proxy keep-alive message to the network proxy; and
   the network proxy managing the re-creation and distribution of the client application keep-alive messages based on information included in the application layer proxy keep-alive message and registration information.

2. The method of claim 1, further comprising the client proxy transforming the application layer proxy keep-alive message into an access stratum (AS) layer message prior to forwarding the application layer proxy keep-alive message to the first protocol stack.

3. The method of claim 1, further comprising the client proxy transforming the application layer proxy keep-alive message into a non-access stratum (NAS) layer message prior to forwarding the application layer proxy keep-alive message to the first protocol stack.

4. The method of claim 1, further comprising:
   the first protocol stack receiving a positive acknowledgement (ACK) message indicating that the application layer proxy keep-alive message was received;
   the first protocol stack forwarding the ACK message to the client proxy; and
   the client proxy forwarding the ACK message to the client applications according to their respective keep-alive message signaling rates.

5. The method of claim 1, wherein the client proxy interfaces with at least one of an access stratum (AS) layer and a non-access stratum (NAS) layer of the first protocol stack.

6. The method of claim 1, further comprising the client proxy embedding additional data into the application layer proxy keep-alive message.

7. A method of a wireless transmit/receive unit (WTRU) maintaining communications connectivity for a plurality of applications and reducing unnecessary message transmissions, the method comprising:

providing a client proxy to interface with a plurality of client applications and a first protocol stack, wherein the WTRU contains the plurality of client applications, the client proxy, and the first protocol stack, and wherein each of the client applications send keep-alive messages at a respective signaling rate;

each of the client applications registering with the client proxy and indicating a respective keep-alive message signaling rate;

the client proxy determining an optimal signaling rate based on the respective keep-alive message signaling rates indicated by the client applications, wherein the optimal signaling rate is associated with a greatest common divisor time for time periods or time intervals associated with the respective registered keep-alive message signaling rates of the respective client applications;

the client proxy generating an application layer proxy keep-alive message associated with the client application keep-alive messages;

the client proxy forwarding the application layer proxy keep-alive message to the first protocol stack; and the first protocol stack transmitting the application layer proxy keep-alive message at the optimal signaling rate.

8. The method of claim 7, further comprising the client proxy transforming the application layer proxy keep-alive message into an access stratum (AS) layer message prior to forwarding the application layer proxy keep-alive message to the first protocol stack.

9. The method of claim 7, further comprising the client proxy transforming the application layer proxy keep-alive message into a non-access stratum (NAS) layer message prior to forwarding the application layer proxy keep-alive message to the first protocol stack.

10. The method of claim 7, further comprising:
the first protocol stack receiving a positive acknowledgement (ACK) message indicating that the application layer proxy keep-alive message was received;
the first protocol stack forwarding the ACK message to the client proxy; and
the client proxy forwarding the ACK message to the client applications according to their respective keep-alive message signaling rates.

11. The method of claim 7, wherein the client proxy interfaces with at least one of an access stratum (AS) layer and a non-access stratum (NAS) layer of the first protocol stack.

12. The method of claim 7, further comprising the client proxy embedding additional data into the application layer proxy keep-alive message.

13. A method of a network node maintaining communications connectivity for a plurality of application servers and reducing unnecessary message transmissions, the method comprising:
providing a network proxy in the network node to interface with a plurality of application servers and a first protocol stack, wherein each of the application servers send client-alive messages at a respective signaling rate, and wherein the network node contains the network proxy and the first protocol stack;
each of the application servers registering with the network proxy and indicating a respective client-alive message signaling rate;
the network proxy determining an optimal signaling rate based on the respective client-alive message signaling rates indicated by the application servers;

the network proxy generating a network layer proxy client-alive message associated with the application server client-alive messages;

the network proxy forwarding the network layer proxy client-alive message to the first protocol stack;

the first protocol stack transmitting the network layer proxy client-alive message at the optimal signaling rate;

providing a client proxy in a wireless transmit/receive unit (WTRU) to interface with a second protocol stack and the network proxy;

the second protocol stack receiving the network layer proxy client-alive message and forwarding the network layer proxy client-alive message to the client proxy; and the client proxy managing the re-creation and distribution of the application server client-alive messages based on information included in the network layer proxy client-alive message and registration information.

14. The method of claim 13, wherein the network proxy interfaces with at least one of an access stratum (AS) layer and a non-access stratum (NAS) layer of the first protocol stack.

15. The method of claim 13, further comprising:
the network proxy and the client proxy managing a commonly shared downlink proxy client-alive session at an access stratum (AS) or non-access stratum (NAS) layer;
the network proxy translating a specific proxy client-alive message format into an AS or NAS layer message;
the network proxy transmitting the AS or NAS layer message to the client proxy; and
the client proxy translating the AS or NAS layer message back to the specific proxy client-alive message format.

16. The method of claim 13, further comprising:
the network proxy capturing a specific application client-alive message format while registering a network application;
the network proxy translating the specific client-alive message format into an access stratum (AS) or non-access stratum (NAS) layer message;
the network proxy transmitting the AS or NAS layer message to the client proxy; and
the client proxy translating the AS or NAS layer message back to the specific client-alive message format.

17. A wireless transmit/receive unit (WTRU) comprising:
a first protocol stack; and
a processor including a client proxy configured to interface with a plurality of client applications and the first protocol stack;
wherein each of the client applications are configured to send keep-alive messages at a respective signaling rate, register with the client proxy and indicate a respective keep-alive message signaling rate;
wherein the client proxy is configured to determine an optimal signaling rate based on the respective keep-alive message signaling rates indicated by the client applications;
wherein the client proxy is configured to generate an application layer proxy keep-alive message associated with the client application keep-alive messages, and forward the application layer proxy keep-alive message to the first protocol stack;
wherein the first protocol stack is configured to transmit the application layer proxy keep-alive message at the optimal signaling rate;

wherein a network proxy in a network node is configured to interface with a second protocol stack and the client proxy;

wherein the second protocol stack is configured to receive the application layer proxy keep-alive message and to forward the application layer proxy keep-alive message to the network proxy; and wherein the network proxy is configured to manage the re-creation and distribution of the client application keep-alive messages based on information included in the application layer proxy keep-alive message and registration information.

18. The WTRU of claim 17, wherein the first protocol stack is configured to receive a positive acknowledgement (ACK) message indicating that the application layer proxy keep-alive message was received, and forward the ACK message to the client proxy, and the client proxy is configured to forward the ACK message to the client applications according to their respective keep-alive message signaling rates.

* * * * *